United States Patent
Ohbayashi et al.

(10) Patent No.: US 7,988,796 B2
(45) Date of Patent: Aug. 2, 2011

(54) SHEAVE MEMBER FOR BELT-TYPE CONTINUOUSLY VARIABLE TRANSMISSION AND METHOD OF MANUFACTURING THE SAME

(75) Inventors: Kouji Ohbayashi, Toyoake (JP); Kazuaki Okada, Okozoki (JP); Taro Matsukawa, Anjo (JP); Yutaka Eto, Anjo (JP); Koki Mizuno, Kariya (JP); Kazumichi Tsukuda, Anjo (JP)

(73) Assignee: Aisin AW Co., Ltd., Anjo-Shi (JP)

( * ) Notice: Subject to any disclaimer, the term of this patent is extended or adjusted under 35 U.S.C. 154(b) by 867 days.

(21) Appl. No.: 11/976,646

(22) Filed: Oct. 26, 2007

(65) Prior Publication Data

US 2008/0099107 A1     May 1, 2008

(30) Foreign Application Priority Data

Oct. 26, 2006 (JP) ................................ 2006-290678

(51) Int. Cl.
    *C23C 8/00*     (2006.01)
    *B21K 1/42*     (2006.01)

(52) U.S. Cl. ...... 148/226; 148/223; 148/233; 29/892.11
(58) Field of Classification Search .................. 148/226, 148/223, 233; 29/892.11; 384/417
See application file for complete search history.

(56) References Cited

U.S. PATENT DOCUMENTS

| | | | |
|---|---|---|---|
| 5,556,348 A | 9/1996 | Kokubu et al. | |
| 6,254,503 B1 | 7/2001 | Chiba et al. | ......................... 474/8 |
| 6,620,262 B1 | 9/2003 | Okita et al. | |
| 2003/0205297 A1 | 11/2003 | Tipps et al. | |
| 2005/0217111 A1* | 10/2005 | Yoshida et al. | .................. 29/892 |
| 2007/0102068 A1 | 5/2007 | Taniguchi et al. | ............ 148/222 |

FOREIGN PATENT DOCUMENTS

| | | | |
|---|---|---|---|
| GB | 2242484 | | 3/1991 |
| JP | 07-003324 | | 1/1995 |
| JP | 07003324 A | * | 1/1995 |
| JP | 2005-113213 | | 4/2005 |
| JP | 2005113213 A | * | 4/2005 |
| WO | WO2006/118242 A1 | | 11/2006 |

OTHER PUBLICATIONS

Murai et al., English machine translation of JP 07-003324A, Jan. 1995.*
Nakajima et al., English machine translation of JP 2005-113213A, Apr. 2005.*
Hassell et al., "Induction Heat Treatments", ASM Handbooks, 2002, ASM International, vol. 4, p. 1-8.*

* cited by examiner

*Primary Examiner* — Roy King
*Assistant Examiner* — Caitlin Fogarty
(74) *Attorney, Agent, or Firm* — Bacon & Thomas, PLLC

(57) ABSTRACT

A method of manufacturing a sheave member for a belt-type continuously variable transmission includes a forming step wherein an intermediate product having a sheave surface is formed by forging a steel material; a carburization step wherein the intermediate product is heated in a carburization gas; a gradual cooling step wherein the cooling speed is equal to or less than 20° C./sec, at least until the temperature of the intermediate product has passed through the transformation point; a high-frequency electrical heating step wherein a selected portion(s) of the intermediate product is heated; a water quenching step wherein the selected portion is quenched by contact with water; and a finishing step wherein a grinding process is applied to the intermediate product to attain the final shape. In the cooling step, preferably, the intermediate product is contacted with a cooling gas at a pressure lower than atmospheric pressure.

17 Claims, 17 Drawing Sheets

F I G . 1
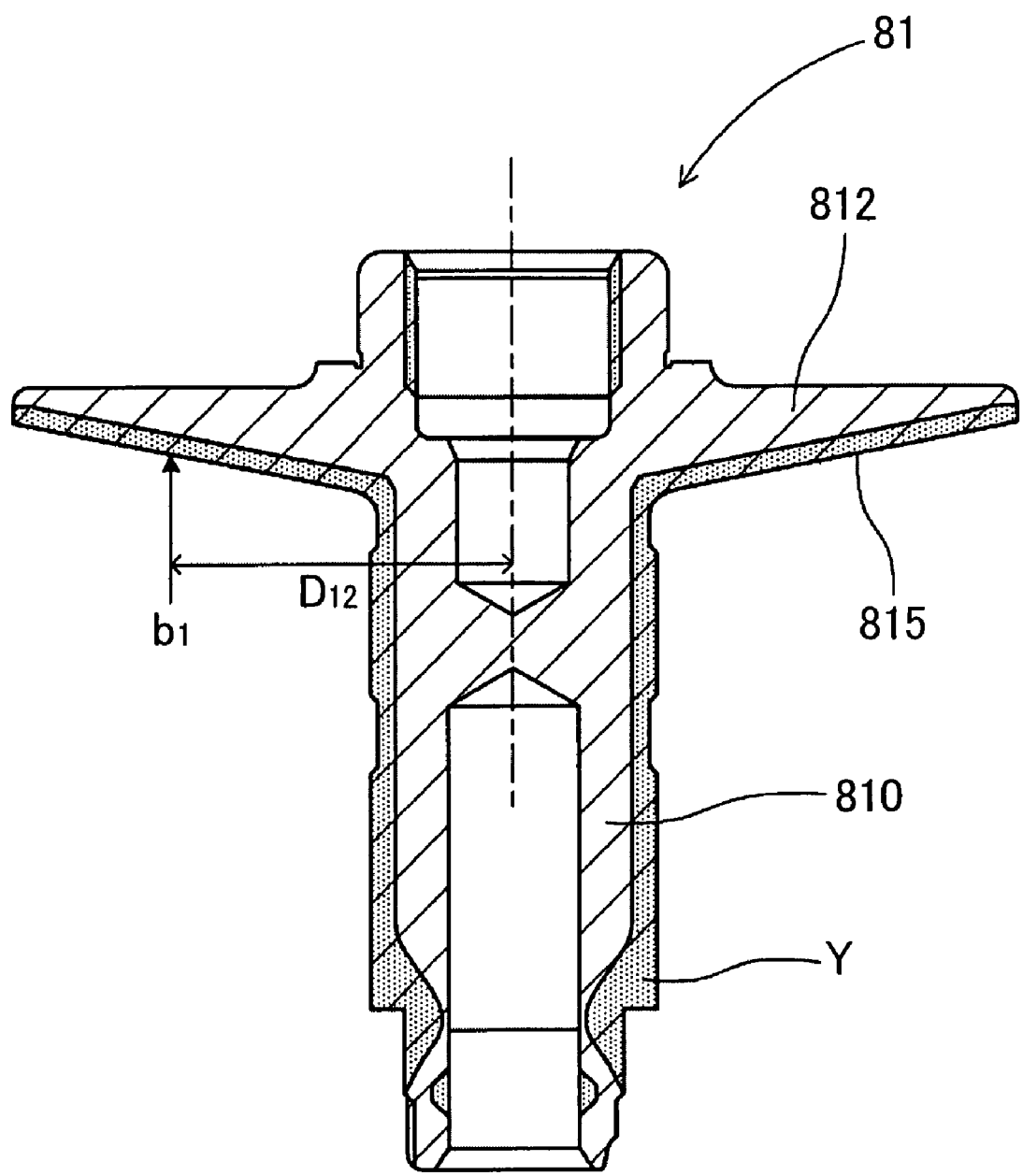

FIG. 5
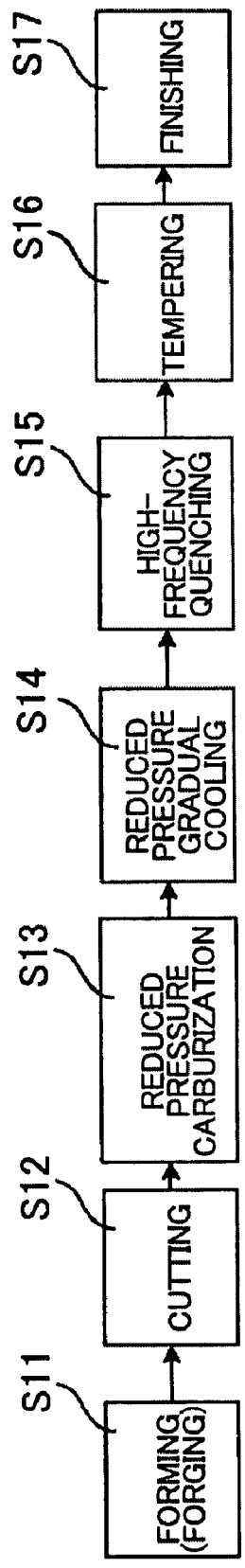
(A) THE PRESENT INVENTION
S11 FORMING (FORGING) → S12 CUTTING → S13 REDUCED PRESSURE CARBURIZATION → S14 REDUCED PRESSURE GRADUAL COOLING → S15 HIGH-FREQUENCY QUENCHING → S16 TEMPERING → S17 FINISHING
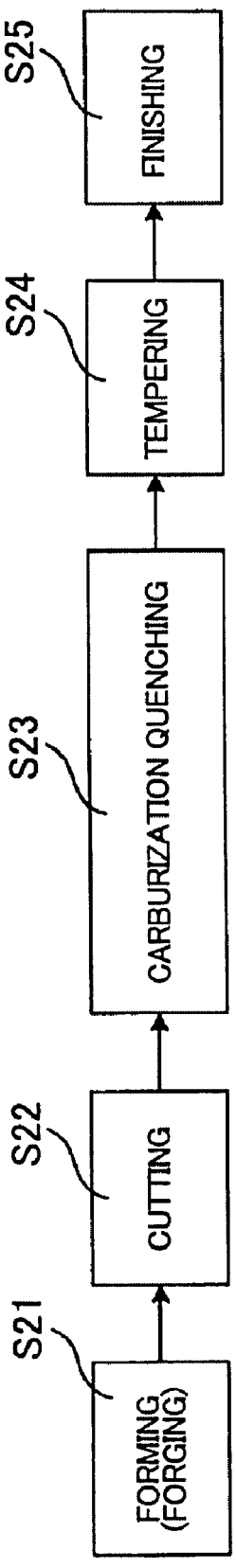
(B) RELATED ART
S21 FORMING (FORGING) → S22 CUTTING → S23 CARBURIZATION QUENCHING → S24 TEMPERING → S25 FINISHING

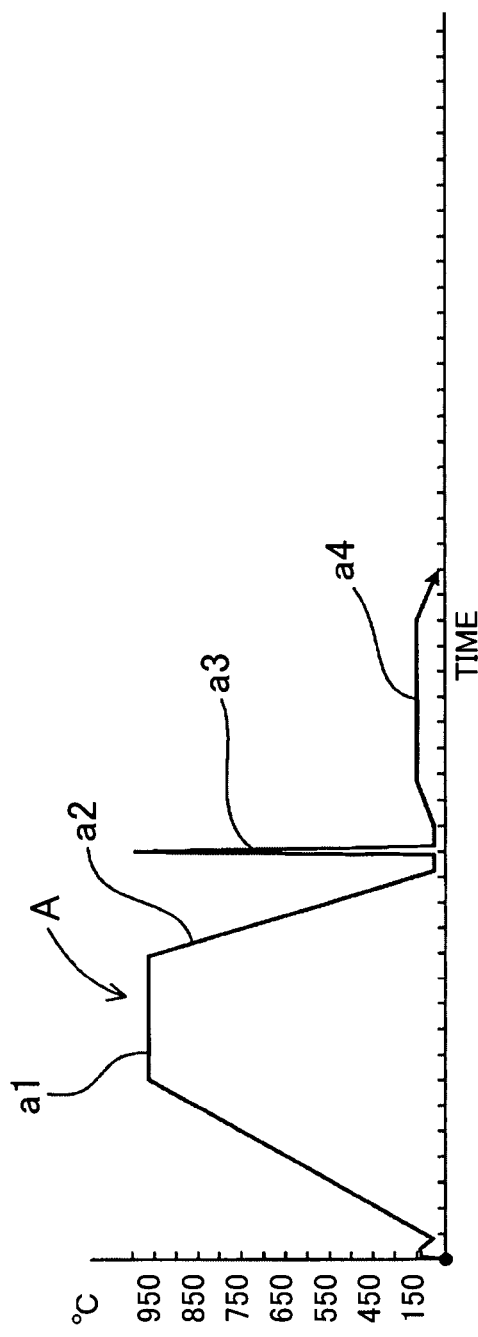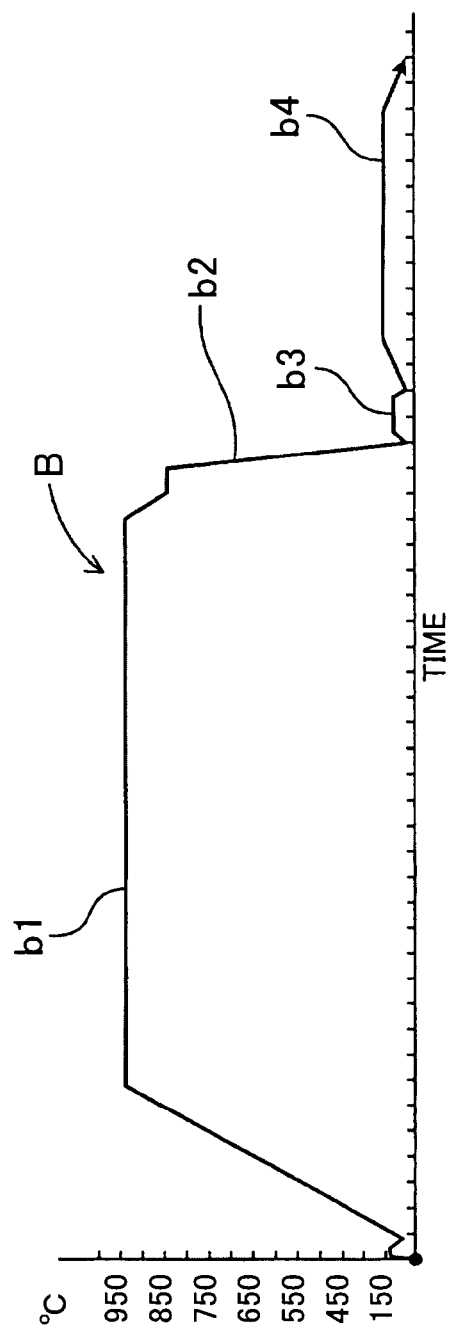
F I G. 6A
F I G. 6B

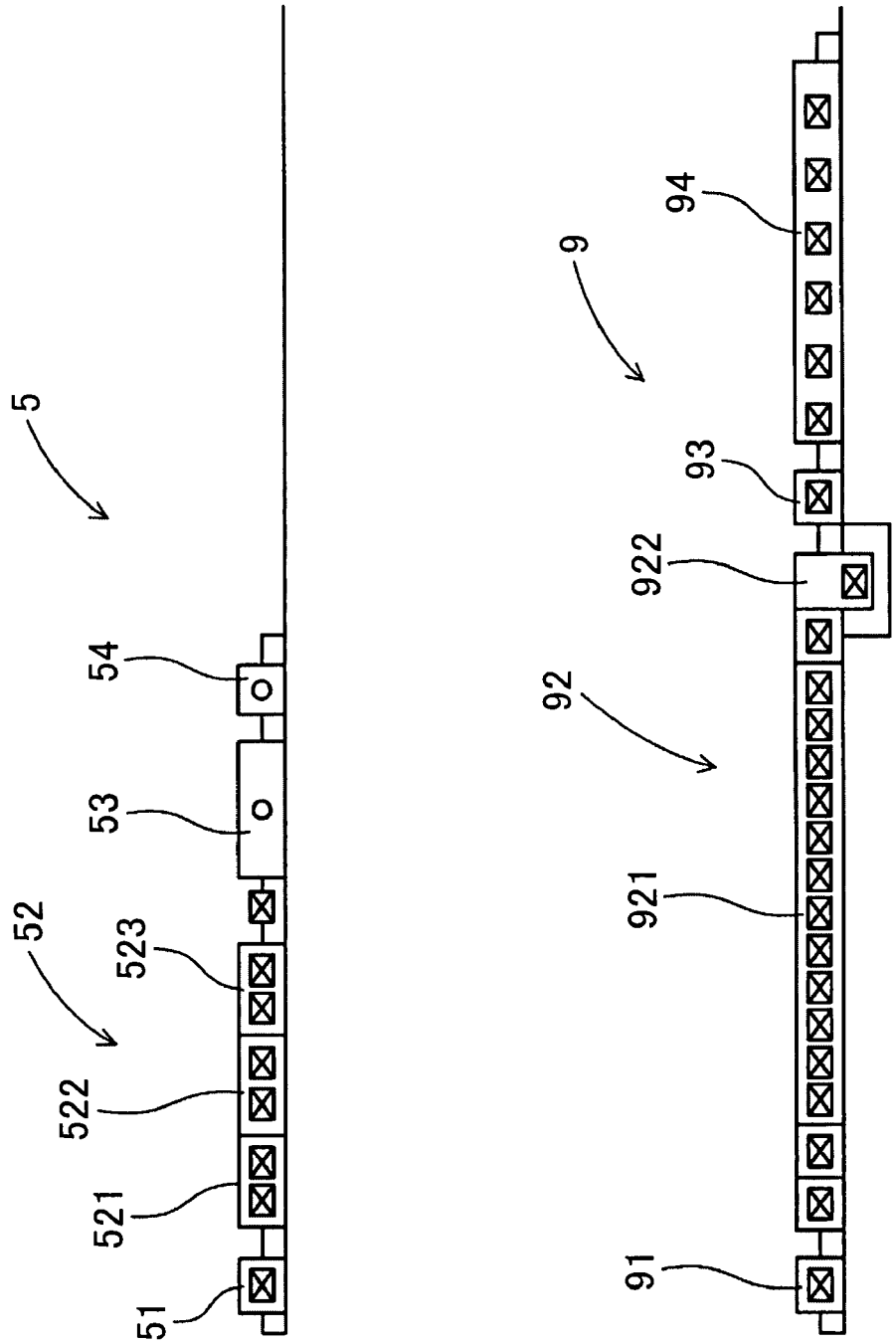

SHEAVE MEMBER FOR BELT-TYPE CONTINUOUSLY VARIABLE TRANSMISSION AND METHOD OF MANUFACTURING THE SAME

INCORPORATION BY REFERENCE

The disclosure of Japanese Patent Application No. 2006-290678 filed on Oct. 26, 2006 including the specification, drawings and abstract is incorporated herein by reference in its entirety.

BACKGROUND OF THE INVENTION

1. Field of the Invention

The present invention relates to a method of manufacturing sheave members for use in a belt-type continuously variable transmission.

2. Description of the Related Art

The stepped automatic transmission in which various gears are selectively engaged, and what is termed a belt-type continuously variable transmission are examples of speed change apparatus for transferring drive power from the engine of an automobile to the drive wheels. The belt-type continuously variable transmission provides a continuous range of speed change, with a belt running between an input-side pulley and an output-side pulley, by changing the pitch (effective) radius of the pulleys.

Each pulley includes a shaft, a fixed sheave having a conical sheave surface that is fixed to the shaft, and a movable sheave that has a conical sheave surface and that is mounted on the shaft for movement relative to the fixed sheave. The fixed sheave and the movable sheave, for the sake of convenience, are herein referred to simply as CVT sheaves.

These CVT sheaves are provided with a sheave surface for frictional contact with the belt, and higher abrasion resistance of the sheave surface and precision of the sheave dimensions have been actively pursued as quality improvements. Thus, for example, in the conventional manufacturing methods for CVT sheaves, after forming the sheave into the desired shape, the sheave is carburized by a quenching process immediately after prolonged heating. Subsequently, grinding is employed in order to improve the dimensional precision. In addition, after the grinding process, in some cases the sheave surface is subjected to shot peening, as disclosed, for example, in Japanese Patent Application Publication No. JP-A-2000-130527.

However, in the manufacturing of a CVT sheave, what is termed the carburization quenching process, in which quenching is carried out immediately after prolonged carburization, conventionally uses oil quenching which suppresses the occurrence of distortions more than water quenching. However, notwithstanding the reduction in distortion achieved by oil quenching, it is not possible to provide dimensional precision which meets the required quality. Thus, as mentioned above, grinding is employed after quenching. However, use of grinding to correct imperfection in the dimensions and shape caused by distortion, requires a grinding allowance which is comparatively deep. In addition, in the carburization process, it is necessary to form a carburized layer to a depth equal to or greater than the grinding allowance, such that a carburized layer remains even after grinding, and an extremely long carburization heating time is necessary.

In light of the foregoing circumstances, in order to manufacture CVT sheaves more efficiently, reducing the manufacturing time while maintaining dimensional precision and hardness characteristics, has been demanded.

SUMMARY OF THE INVENTION

In consideration of the problems of the related art described above, it is an object of the present invention to provide a manufacturing method for a CVT sheave which shortens the time of manufacture without sacrifice of dimensional precision and hardness characteristics.

In a first aspect, the present invention provides a method of manufacturing a sheave member for a belt-type continuously variable transmission that is provided with a sheave surface to be brought into contact with the belt. The method includes: a forming step in which a steel intermediate product with a sheave surface is formed by forging a steel material; a carburization step in which the intermediate product is subjected carburization by being heated in a carburization gas; a cooling step in which the intermediate product, after carburization, is gradually cooled at a cooling speed that is slower than the speed at which the microstructure of the intermediate product undergoes a martensitic transformation; a step of high-frequency heating of a selected portion of the previously cooled intermediate product; a quenching step in which, after the selected portion of the cooled intermediate product has been subjected to high-frequency heating, that selected portion is water quenched; and a finishing step wherein a finished (final) product is obtained by grinding the intermediate product.

Because the manufacturing method of the present invention, after carburization, employs gradual cooling at a cooling speed that is slower than the speed at which the microstructure of the intermediate product undergoes martensitic transformation, without quenching, it is possible to significantly reduce distortion in comparison to the prior art methodology which involves no such step prior to quenching.

Next, in the present invention, a selected portion of the intermediate product, following carburization, is subjected to high-frequency heating followed by water quenching. In the high-frequency heating step, rather than heating the entire intermediate, only that selected portion, selected to be increased in strength by quenching, is rapidly heated by using a high frequency. Then, the selectively heated intermediate product is rapidly cooled by water quenching. By using water quenching, it is possible to increase the cooling effect, and it is also possible to further increase strength, as compared to conventional oil quenching. Furthermore, more than in the conventional method in which the entire member undergoes a quenching, it is possible to significantly reduce distortion during the quenching step. Due to a reduction in the distortion and the quenching effect, it is possible to reduce the degree of carburization and, at the same time, it is possible to reduce the grinding allowance in the subsequent grinding process. Furthermore, by reducing grinding allowance, it is possible to also reduce the depth of the carburization layer that is formed in the carburization step and thereby shorten the time required for carburization.

Therefore, the present invention provides a method for manufacturing a CVT sheave with the dimensional precision provided by the related art while reducing the process time.

The sheave member manufactured by the manufacturing method according to the present invention may be used for a belt-type continuously variable transmission.

In summary, the CVT sheave of the present invention can be manufactured in less time, enables cost reduction, exhibits hardness characteristics that are equivalent to those of the related art, and has superior dimensional precision.

BRIEF DESCRIPTION OF THE DRAWINGS

FIG. 1 is a cross-sectional view of a fixed sheave of a primary pulley in accordance with a first embodiment of the present invention;

FIG. 5A is a block diagram of the process of the first embodiment of the present invention, and FIG. 5B is a block diagram of the related art process;

FIG. 6A is a graph of heating pattern (temperature vs. time) in the method of the first embodiment of the present invention;

FIG. 6B is a graph of a heat pattern in a comparative method;

FIG. 7A is a schematic illustration of a heat treatment facility for carrying out the method of the first embodiment of the present invention;

FIG. 7B is a carburization quenching facility used in the comparative method;

DETAILED DESCRIPTION OF THE PREFERRED EMBODIMENTS

Figure 2:
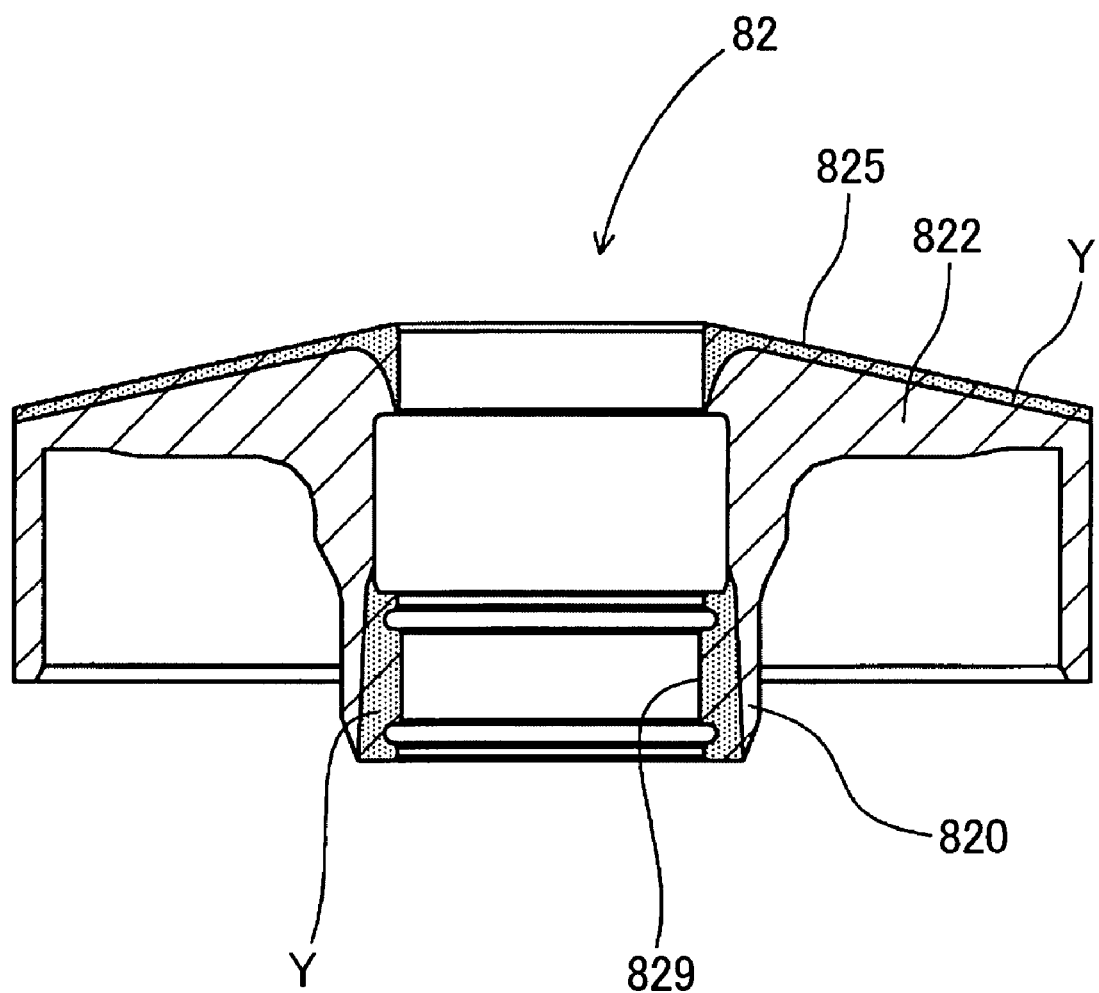
FIG. 2 is a cross-sectional view of a movable sheave of the primary pulley in the first embodiment.

In the manufacturing method of the present invention, gradual cooling is carried out at a cooling speed that is slower than the speed at which the microstructure of the intermediate product undergoes a martensitic transformation. Thus, it is possible to prevent the distortions due to a phase transition, i.e., martensitic transformation. Although the cooling speed, slower than the speed that induces this martensitic transformation, is dependent on the material, the specific speed can be determined by experiment.

Preferably, in the cooling step, gradual cooling is carried out such that the cooling speed is equal to or less than 20° C./sec at least until the temperature of the steel product undergoing processing passes through the transformation point A1. In this manner, with many of the materials that can be suitably used for CVT sheaves, it is possible to suppress martensitic transformation, and to thereby suppress distortion comparatively easily.

More preferably, gradual cooling is carried out such that the cooling speed is equal to or less than 10° C./sec at least until the temperature of the intermediate product passes through the transformation point A1. In this manner, it is possible to further suppress occurrence of thermal distortion caused by variation in the cooling speed.

However, if the cooling speed is too slow, the cooling time is prolonged resulting in a decrease in productivity. Thus, preferably, the cooling speed is equal to or greater than 0.1° C./sec, and more preferably, it is equal to or greater than 0.5° C./sec.

Therefore, the cooling speed is preferably in a range of 0.1 to 20° C./sec, and more preferably the cooling speed is in a range of 0.5 to 10° C./sec.

In addition, in the cooling step, the gradual cooling is preferably with reduced pressure, i.e. the pressure of the cooling gas that covers the intermediate product is reduced to be lower than atmospheric pressure.

In the present invention, as described above, following the cooling step, high-frequency heating is adopted in preparation for quenching. Thus, it is possible to significantly suppress distortion, to a greater extent than conventional carburization and quenching.

Even if a high-frequency heating/quenching is adopted, the subsequent grinding allowance must be large if the treated body has already become distorted before this step. Of course, in the present invention, although it is possible to suppress distortion by employing gradual cooling, for the sheave surface and the like where the dimensional precision must be high, a further suppression of distortion may be required. Most preferably, such a further improvement is realized by reduced pressure in the gradual cooling step between the carburization step and the high-frequency/heating quenching step. More specifically, in cooling the steel intermediate product, reduced pressure gradual cooling is adopted in which the intermediate product, having been heated to a high temperature in the carburization step, is cooled while the pressure of the cooling gas is reduced to a pressure below atmospheric pressure. Thus, in comparison to cooling at atmospheric pressure, it is possible to more significantly reduce distortion of the intermediate product.

If the cooling gas is at a reduced pressure and is agitated during cooling, it is possible to reduce the differences in the cooling speed up-wind and down-wind in the circulating cooling gas, as compared with use of cooling at atmospheric pressure. Where gradual cooling is carried out at atmospheric pressure, simply by bringing the member to be cooled into contact with the cooling gas at atmospheric pressure, the heat exchange starts the cooling of the intermediate product. In this case, up-wind and down-wind portions are generated by active gas agitation by gas convection caused by heat, and cooling speed differences occur. Temperature differences in the cooled intermediate product occur due to the cooling speed differences, and thus thermal treatment distortions occur. In contrast, by using cooling at a reduced pressure, even if there are up-wind and down-wind areas, the thermal exchange rate is slow by nature, and thus cooling speed differences are unlikely to occur. Thus, when reduced pressure gradual cooling is adopted, because the cooling progresses in a comparatively uniform manner, thermal treatment distortion is low. Even without agitation, with reduced pressure cooling, it is possible to reduce differences in the cooling speed due to stagnation in portions of the cooling gas having different temperatures, as compared to the case of atmospheric pressure cooling.

Thus, by using reduced pressure cooling gas, it is possible to better reduce the occurrence of distortion in the steel intermediate product and to proceed to the high-frequency heating/quenching while maintaining high dimensional precision. In addition, thus, it is possible to take advantage of the benefits due to high-frequency heating/quenching described above, and to produce a steel (intermediate) body after quenching that has few distortions and high precision.

For the reduced pressure gradual cooling of the high-temperature intermediate product that has been subjected to carburization, it is not necessary to continue the reduced pressure state until the cooling has completed. After entering the low temperature region in which there is almost no incidence of distortion, it is not necessary for the cooling to be continued in a reduced pressure atmosphere. Rather, cooling may be continued at atmospheric pressure or at a pressure greater than atmospheric pressure.

In addition, midway during the reduced pressure gradual cooling, it is possible to further lower the reduced pressure and/or change the agitation. In the low temperature region in which there is less concern for distortion, in an industrial context, conditions may be changed to improve the cooling efficiency as desired.

The duration of the reduced pressure gradual cooling can be changed depending on the temperature of the intermediate steel body and/or the cooling conditions. The optimal conditions change according to the type of the material (steel alloy) of the intermediate product (the CVT sheave), the amount of material that is processed at one time, the type of the cooling gas, and the performance of the apparatus for agitating the cooling gas and the like. Therefore, preferably, the cooling conditions are optimized by experiment.

Where the duration of the reduced pressure gradual cooling is determined according to the temperature, it is possible to set the cooling period to end when, for example, a predetermined temperature equal to or less than 500° C. has been reached. It is possible to obtain the desired effect sufficiently if the reduced pressure gradual cooling is carried out under conditions that enable the suppression of the occurrence of distortions up to at least 500° C.

In the cooling step, a reduced pressure is more effective in suppressing distortion than cooling at atmospheric pressure, even if the cooling gas in the reduced pressure cooling is not agitated. However, more preferably, suitable agitation is employed to prevent stagnation of the cooling gas.

Thus, the reduced pressure gradual cooling is preferably carried out while agitating the cooling gas to better suppress distortion.

In addition, preferably, the reduced pressure gradual cooling spans a period beginning before start of the microstructure transformation of the intermediate product due to cooling until the entire microstructure transformation has been completed. When the intermediate product is cooled from the austenite state to room temperature, the microstructure transformation will always occur, and distortions will necessarily result from the microstructure transformation. In particular, if the cooling conditions during the microstructure transformation vary depending on the part, distortions readily occur. Thus, the microstructure transformation within the intermediate product is preferably completed during the period of the cooling step.

The reduced pressure in gradual cooling is preferably within a range of 0.1 bar to 0.65 bar. If the pressure is reduced to less than 0.1 bar, there is a problem in that the pressure reducing apparatus becomes excessively costly. On the other hand, if a pressure of 0.65 bar is exceeded, there is the problem in that the desired effect due to the reduced pressure of the cooling gas becomes too little.

Thus, the reduced pressure of the cooling gas is preferably within a range of 0.1 bar to 0.3 bar. In particular, by setting the range to be equal to or less than 0.3 bar, it is possible to obtain the effect due to the reduced pressure described above.

In the cooling step, the speed of agitation of the cooling gas may be increased after the temperature of the intermediate product has cooled to or below that of the transformation point $A1$. After entering the temperature region at or below the transformation point $A1$, temperatures of the intermediate product do not cause distortions to occur, and it then becomes possible to improve the cooling efficiency by increasing the speed of agitation of the cooling gas. The easiest method is to set the speed of agitation at the start of the cooling step to 0 or to a minimal speed, and subsequently, to increase the speed of agitation after the temperature of the intermediate product has become equal to or less than the transformation point $A1$. Thus, the cooling performance is increased after the temperature of the intermediate product has become equal to or less than the transformation point $A1$, and it is thereby possible to shorten the overall cooling time. In increasing the agitation speed, the agitation speed may be suddenly increased or, more preferably, gradually increased.

Further, in the cooling step, the pressure of the cooling gas may be increased after the temperature of the intermediate product has cooled to or below the transformation point $A1$. In this case, after cooling to the transformation point $A1$ or below, at which the temperature of the intermediate product is not likely to produce distortion, the cooling speed may be increased by increasing the pressure of the cooling gas, thereby shortening the overall cooling time. Of course, it is possible to combine an increase in the pressure of the cooling gas with an increase of the agitation speed.

The pressure increase during the cooling step is always limited so that the pressure remains lower than atmospheric pressure. While the pressure increase may be carried out all at once, preferably, the pressure increase is gradual. Of course, as described above, after the cooling step has been completed, an increase to atmospheric pressure or greater cannot be avoided.

The cooling gas may be different from the carburization gas used in the reduced pressure carburization step. Preferably, the cooling gas is nitrogen ($N_2$ gas). Use of nitrogen, for example, suppresses the oxidization of the intermediate product while it is cooling. Of course, it is possible to use various conventional non-oxidizing gases, other than nitrogen, as the cooling gas.

The carburization step is preferably a reduced pressure carburization step in which the intermediate product is subjected to carburization under reduced pressure. In this reduced pressure carburization, it is possible to use a comparatively small amount of the carburization gas while maintaining the interior of the high-temperature carburization furnace at a reduced pressure (a pressure below atmospheric), whereby the carburization treatment is more efficient than in the related art.

In the carburization step, the intermediate product is heated to a temperature equal to or above the austenitizing temperature, and preferably, the intermediate product is heated under a reduced pressure of 0.001 to 0.1 bar. In the case in which the reduced pressure during carburization is less than 0.001 bar, there is the problem that costly equipment is necessary for maintaining a vacuum. On the other hand, if the reduced pressure exceeds 0.1 bar, there is a concern that soot will be produced during carburization, thereby producing irregularities in the carburization density.

The carburization gas may be, for example, acetylene, propane, butane, methane, ethylene, ethane, or the like.

In the reduced pressure carburization step, it is possible to achieve a high concentration carburization in which a compound of iron and carbon is deposited in the surface layer, thereby increasing the surface density compared to that of normal carburization. Alternatively, a nitriding treatment may be carried out simultaneously with the carburization treatment.

Preferably, the material treated in accordance with the present invention is a carbon steel that incorporates C: 0.20 to 0.45%, as mass percent. In the case of a high carbon steel in which the amount of incorporated C exceeds 0.45%, there are problems in that the efficiency of the grinding process which precedes the heating step is compromised, and the service life of the grinding instrument is shortened. On the other hand, in the case in which the amount of incorporated C is less than 0.20%, there is a problem in that there may be portions in which a carburization layer is not formed and, therefore, the product cannot be sufficiently strengthened.

Preferably, the carburization step produces a maximum carburization density for the carburization layer of C: 0.5 to 1.0 mass percent. If the carburization density of the carburization layer is less than C: 0.5 mass percent, there is a problem in that a sufficient increase in hardness due to the carburization cannot be attained. On the other hand, if the carburization density exceeds 1.0 mass percent, the result is formation of cementite ($Fe_3C$), which is harmful in terms of the strength at the austenite crystal grain boundaries of the material, and overall reduction in strength.

When the reduced pressure carburization step and the reduced pressure gradual cooling step are carried out in succession, it is possible to directly connect the reduced pressure carburization chamber and the reduced pressure gradual cooling chamber, and it is not necessary to provide a chamber or the like therebetween so as to adjust the pressure. Because the carburization step and the gradual cooling step are both carried out under a reduced pressure, it is possible to make the pressure difference between the steps small. Thus, it is possible to carry out the reduced pressure gradual cooling without exposing the intermediate product, that has undergone the reduced pressure carburization treatment, to normal atmospheric pressure, thus minimizing occurrence of distortion and providing high efficiency.

The cooling speed of the water quenching in the quenching step is preferably 200° C./sec to 2000° C./sec. When the cooling speed is slower than 200° C./sec, there is a concern that the quenching will not be sufficiently effective. On the other hand, when the cooling speed exceeds 2000° C./sec quenching becomes difficult.

Embodiment 1

An embodiment of a method of manufacturing a CVT sheave according to the present invention and the results of its evaluation (examples 1 to 8) will be explained with reference to FIGS. 1 to 15.

FIG. 1 to FIG. 4 shows a total of four types of manufactured CVT sheaves: a pair of sheave members (CVT sheaves) 81 and 82 that form the primary pulley in the belt-type continuously variable transmission and a pair of sheave members (CVT sheaves) 83 and 84 that form the secondary, pulley in the belt-type continuously variable transmission. The basic structure of the belt-type continuously variable transmission has a belt in a groove defined in the primary pulley that consists of the CVT sheaves 81 and 82 and a groove defined in the secondary pulley that consists of the CVT sheaves 83 and 84.

As shown in FIG. 1, the CVT sheave 81 includes a shaft portion 810 and a sheave portion 812 that are integrally formed, and the conically shaped surface of the sheave portion 812 is a sheave surface 815. Below, this CVT sheave 81 will also be referred to as primary fixed sheave 81.

As shown in FIG. 2, the CVT sheave 82 includes an external tubular portion 820, that is provided with a through hole 829 into which the shaft portion 810 of the fixed sheave 81 can be inserted, and a sheave portion 822, and the conical surface of the sheave portion 822 is a sheave surface 825. The CVT sheave 82 is able to slide axially relative to the shaft portion 810 of the fixed sheave 81. Below, this CVT sheave 82 will also be referred to as a primary movable sheave 82.

Figure 3:
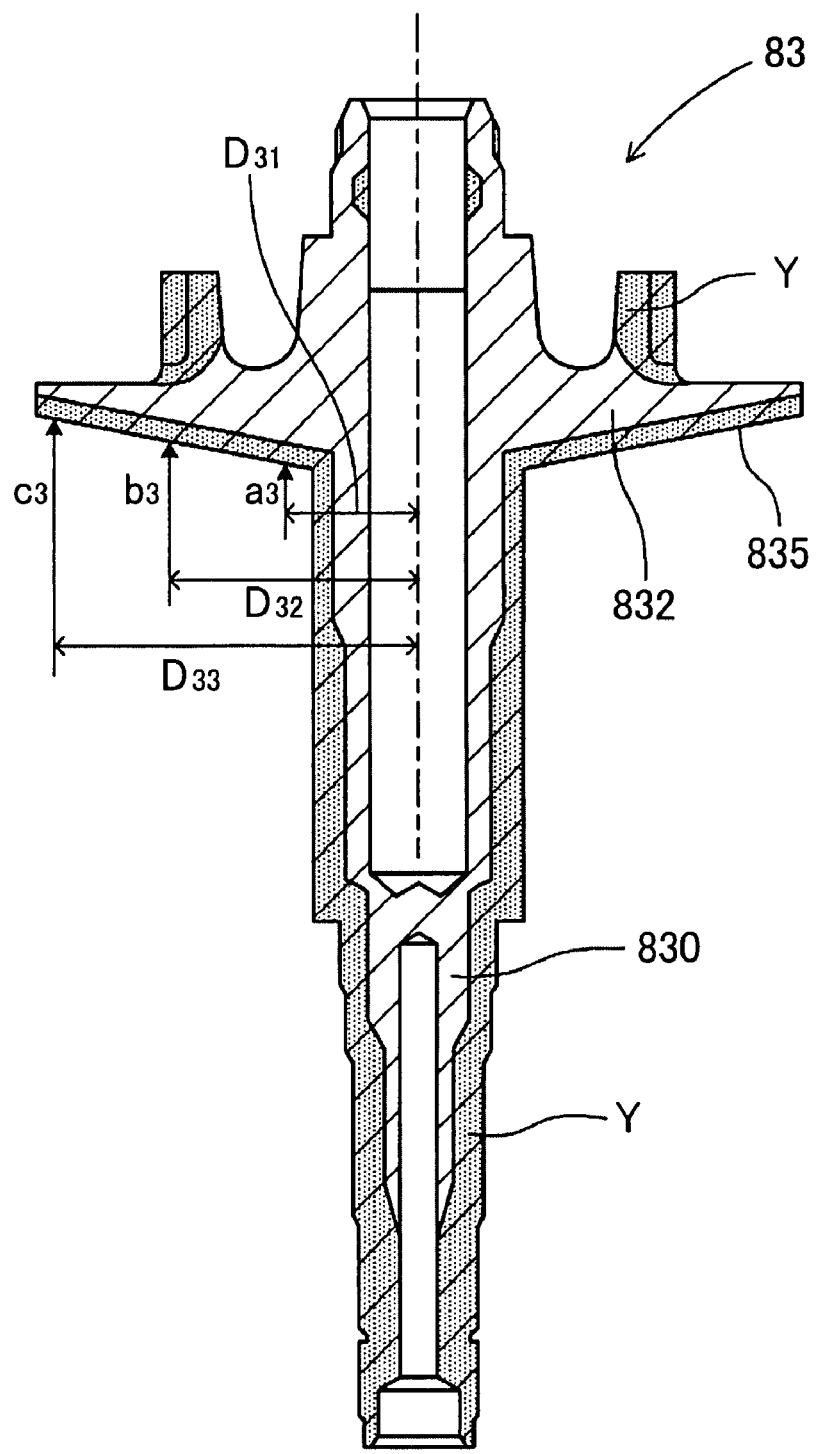
FIG. 3 is a cross-sectional view of a fixed sheave for a secondary pulley in the first embodiment.

As shown in FIG. 3, the CVT 83 includes a shaft portion 830 and a sheave portion 832 that are integrally formed, and the conically shaped surface of the sheave portion 832 is a sheave surface 835. Below, this CVT sheave 83 will also be referred to as a secondary fixed sheave 83.

Figure 4:
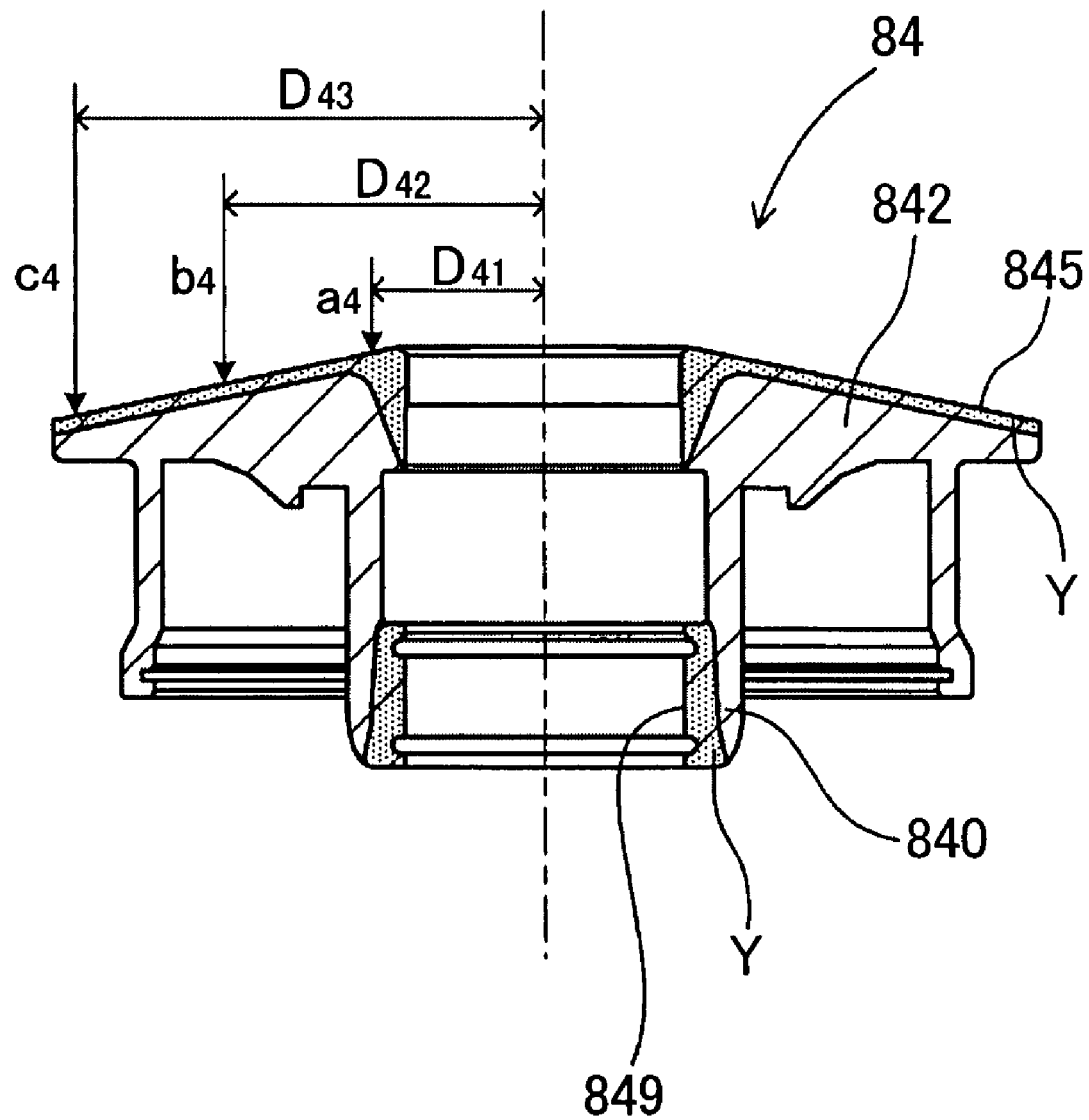
FIG. 4 is a cross-sectional view of a movable sheave for the secondary pulley in the first embodiment.

As shown in FIG. 4, the CVT sheave 84 includes an external tubular portion 840, that is provided with a through hole 849 into which the shaft portion 830 of the secondary fixed sheave 83 can be inserted, and a sheave portion 842, and the conical surface of the sheave portion 842 is a sheave surface 845. The CVT sheave 84 is able to slide axially on the shaft portion 830 of the secondary shaft 83. Below, this CVT sheave 84 will also be referred to as a secondary movable sheave 84.

Note that, as shown in FIG. 1 to FIG. 4, the hatched portion Y is the portion (referred to as the "quenched portion" Y) that has been hardened by the high-frequency heating/quenching process, which will be described later.

The four types of CVT sheaves 81 to 84 were manufactured both by the method of the present invention and by a method using a related art carburization quenching (comparative method), for comparison.

As shown in FIG. 5A, the method of the present invention includes seven main steps, that is, steps S11 to S17.

Step S11 is a forging process applied to a steel material to mold the same into intermediate products that have a sheave surface. The intermediate products of Step S11 have the rough shape of each of the CVT sheaves 81 to 84 described above.

Step S12 is a grinding process in which intermediate products of S11 are ground to a shape close to the final shape.

Step 13 is a carburization process in which the intermediate products are heated in a carburization gas. In the present embodiment, as will be explained later, a reduced pressure carburization treatment is used.

Step S14 is a cooling step in which the intermediate products that have completed the carburization process are gradually cooled at a cooling speed equal to or less than 20° C./sec at least until the temperature of the intermediate product has passed through the transformation point A1. In the present embodiment, a reduced pressure gradual cooling as described later is used.

Step S15 is a quenching process in which the desired portions of the cooled intermediate products are water quenched after high-frequency heating.

Step S16 is a tempering process applied to the intermediate products after quenching.

Step S17 is a grinding process applied to the intermediate products in order to attain the final shape.

As shown in FIG. 5B, the related art method, used for comparison here, includes five main steps, that is, steps S21 to S25.

Step S21 is a forging process applied to a steel material to mold it into the intermediate products that have a sheave surface, but only a rough shape. This is identical to step S11 described above.

Step S22 is a grinding process in which the intermediate products are ground to a shape close to the final shape. This is identical to step S12 described above.

Step S23 is a carburization and quenching process in which a carburization quenching in accordance with the related art is applied to the intermediate products.

Step S24 is a tempering process applied to the intermediate products after quenching.

Step S25 is a grinding process in which the intermediate products are ground to their final shape.

Next, Steps S13 to S16 of the present invention and steps S23 and S24 of the related art process, will be explained in more detail.

In FIG. 6A, the heat pattern A in the method of the present invention is shown, and in FIG. 6B, the heat pattern B in the comparative method is shown. These figures show the time on the abscissa and the temperature on the ordinate, and the temperatures of the intermediate products during heat treatment are shown as the heat patterns A and B.

In the method of the present invention, as can be understood from heat pattern A, first, a reduced pressure carburization process A1 (S13) is carried out. In the reduced pressure carburization process A1, treatment is conducted at 950° C. for 75 minutes for carburization and diffusion with reduction of the pressure in the carburization chamber at this time to 200 Pa using acetylene as the carburization gas.

In the cooling process a2 (S15), immediately after the reduced pressure carburization process A1, the cooling gas is nitrogen (N2), the reduced pressure is 600 hPa. For the first 40 minutes the cooling gas in the furnace is agitated with the speed of the agitation fan set at approximately half the rated rotational speed. Subsequently, the pressure is lowered to 800 hPa for 20 minutes with the speed of the agitation fan increased to the rated rotational speed, with the cooling speed equal to or less than 10° C./sec, at least until a temperature equal to or less than 150° C. has been attained.

Next, in step (S16), the sheave surface and the like of the intermediate products is selectively and partially heated to 950° C. by high-frequency heating, followed by a water spray for water quenching. The conditions of the high-frequency electric heating differ for each CVT sheave because the quenching regions differ slightly depending on the type of CVT sheave. For example, with respect to the sheave surface, the conditions for the primary fixed sheave 81 are a frequency of 8.8 kHz, electric power of 200 kW, and heating time of 6.8 seconds; the conditions for the primary movable sheave 82 are a frequency of 15 kHz, a set electrical power of 150 kW, and a heating time of 7.5 seconds; the conditions for the secondary fixed sheave 83 are a frequency of 8.8 kHz, a set electrical power of 270 kW, and a heating time of 6.0 seconds; and the conditions for the secondary movable sheave 84 are a frequency of 15 kHz, a set electric power of 150 kW, and a heating time of 5.8 seconds. In addition, with respect to the inner diameter side of the primary movable sheave 82 and the secondary movable sheave 84, the conditions for the primary movable sheave 82 are a frequency of 30 kHz, a set electric power of 60 kW, and a heating time of 6.2 seconds, and the conditions for the secondary movable sheave 84 are a frequency of 30 kHz, a set electrical power of 60 kW, and a heating time of 6.7 seconds.

Furthermore, a tempering process a4 (S17), wherein 150° C. is maintained for 70 minutes, is added.

In contrast, as can be understood from the heat pattern B in the figures, the comparative method includes a typical carburization process b1, in which the intermediate products are heated up to 950° C., which is the carburization temperature, and then maintained at this temperature for 430 minutes, and subsequently a quenching process b2 is carried out, in which, after maintaining 850° C., which is the quenching temperature, oil quenching is carried out (S23). In addition, the comparative method includes a washing process b3, in which the cooling agent (oil) that has adhered during the oil quenching is washed off, and a tempering process b4, which aims to maintain the toughness of the quench-hardened layer.

Next, the heat treatment facility 5 for conducting the method of the present invention and the carburization quenching facility 9 for conducting the comparative method will be briefly explained.

As shown in FIG. 7(a), the heat treatment facility 5 for implementing the method of the present invention is provided with a pre-washing vessel 51 for washing the steel member before the carburization quenching treatment, a reduced pressure carburization and gradual cooling apparatus 52 that is provided with a heating chamber 521, a reduced pressure carburization chamber 522, and a reduced pressure cooling chamber 523, a high-frequency quenching apparatus 53, and a magnetic defect inspection apparatus 54 for testing for defects.

As shown in FIG. 7B, the carburization quenching facility 9 used for the comparative method includes a pre-washing vessel 91 for washing the steel member before the carburization quenching treatment, a long carburization furnace 92 that is provided with a carburization furnace 921 for carrying out heating, carburization, and diffusion, and a quenching oil vessel 922, a washing vessel 93 for washing the steel member after the carburization quenching treatment, and a tempering furnace 94.

Example 1

Figure 8:
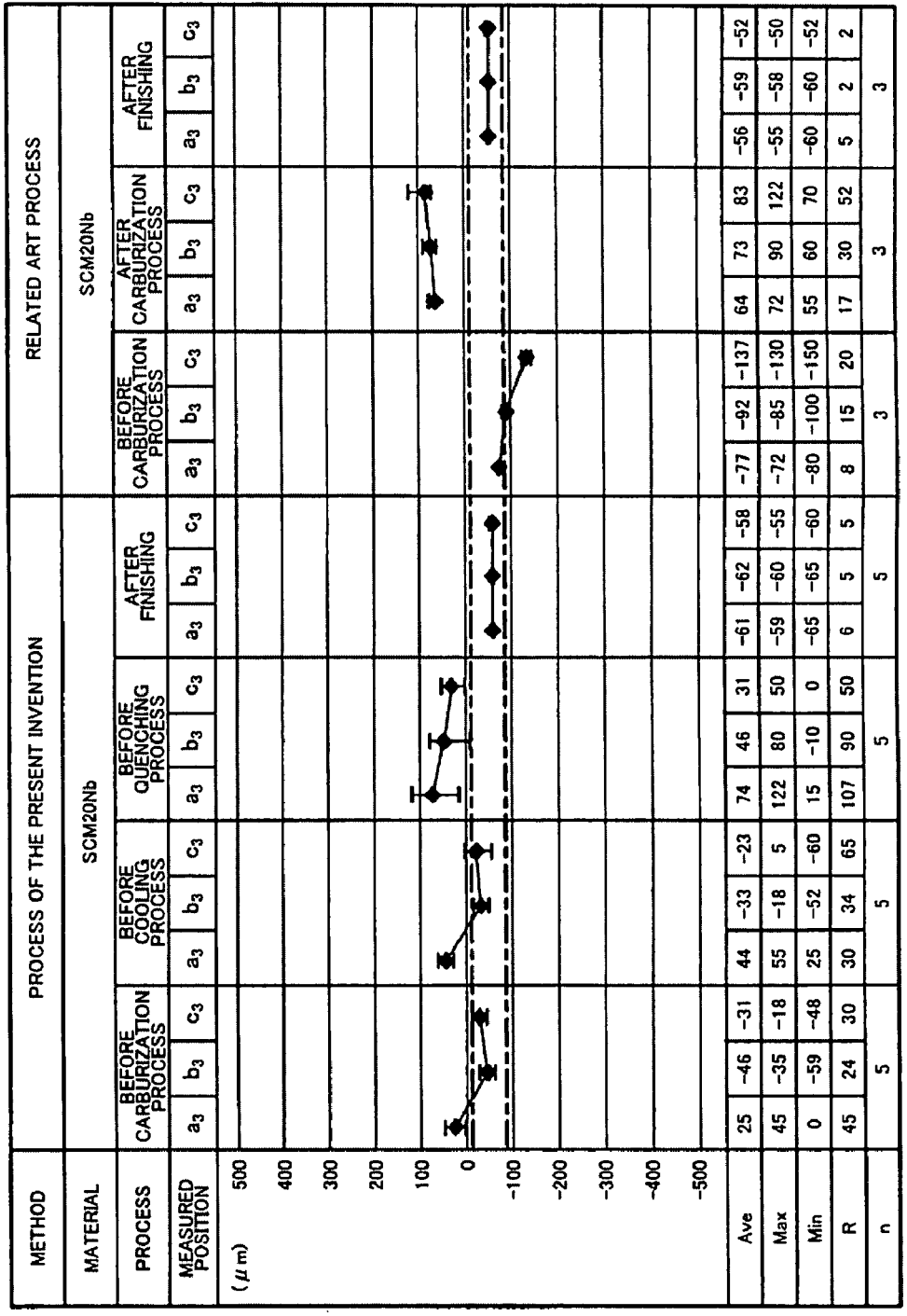
FIG. 8 is a table of the distortion measurements for the fixed sheave surface of the secondary pulley in example 1.

FIG. 8 shows the results of the evaluation of distortion occurrence in the secondary fixed sheaves 83 that have been manufactured by the process of the present invention and the related art process as described above.

Note that, as a raw material, SCM420Nb manufactured by Aichi Steel (KK) was used in both the process of the present invention and in the related art process. The chemical composition thereof is shown in TABLE 1.

TABLE 1

| | Chemical composition (mass %) of SCM420Nb | | | | | | | | | | | | | | | |
|---|---|---|---|---|---|---|---|---|---|---|---|---|---|---|---|---|
| | C | Si | Mn | P | S | Cu | Ni | Al | Cr | Mo | V | N | Ti | B | Nb | Fe |
| Standard | 0.17~0.23 | 0.15~0.35 | 0.55~090 | <0.03 | 0.010~0.025 | <0.3 | <0.25 | 0.025~0.040 | 0.85~1.25 | 0.15~0.35 | — | 0.0014~0.0020 | — | — | 0.05~0.08 | bal. |
| Results | 0.21 | 0.25 | 0.74 | 0.026 | 0.018 | 0.14 | 0.07 | 0.028 | 1.13 | 0.16 | — | 0.001 | — | — | 0.06 | bal. |

In FIG. 8, for the present invention, the results of distortion measurements at four different times are shown: before the carburization step S13, after the cooling step S14, after the high-frequency heating and quenching step S15, and after the finishing process step S17. With respect to the related art process, the results of distortion measurements at three different times are shown: before and after the carburization quenching process S23, and after the finishing process S25.

As shown in FIG. 3, the distortion measurements of the secondary fixed sheave 83 were made at three locations ($a_3$ to $c_3$) on the sheave surface 835. The measured position $a_3$ is a position at which the distance $D_{31}$ from the shaft center of the secondary shaft 83 was 60 mm, the measured position $b_3$ is a position at which the distance $D_{32}$ from the shaft center was 98 mm, and the measured position $c_3$ is a position at which the distance $D_{33}$ from the shaft center was 135 mm. In addition, the evaluation was carried out by measuring the axial distance between each of the measured positions and a predetermined reference point, and calculating the difference between this distance and a target value. In addition, the evaluation was carried out by using the average value (AVE) of the entire circumference, the maximum value (MAX) for the entire circumference, and the minimum value (MIN) for the entire circumference, and the difference (R) between the maximum value and the minimum value. Note that the number of the experiments is shown as n. In addition, in the middle section of FIG. 8, the measurement results are shown as a graph.

As can be understood from the figure, in the case of the present invention, through the entire heat treatment process, the shape characteristics were stable, and it can be understood that the relative positional relationships between at least the measured position $a_3$ and the measured position $c_3$ changed little.

In contrast, in the case of the related art process, the shape changed significantly as between before the carburization quenching and after the carburization quenching.

The above results show that the present invention is able to better suppress the occurrence of distortion due to the heat treatment process, as compared to the related art process. Further, if the shape before the heat treatment is suitably retained, it can be concluded that the grinding allowance for the final finishing process is also reduced.

Example 2

Figure 9:
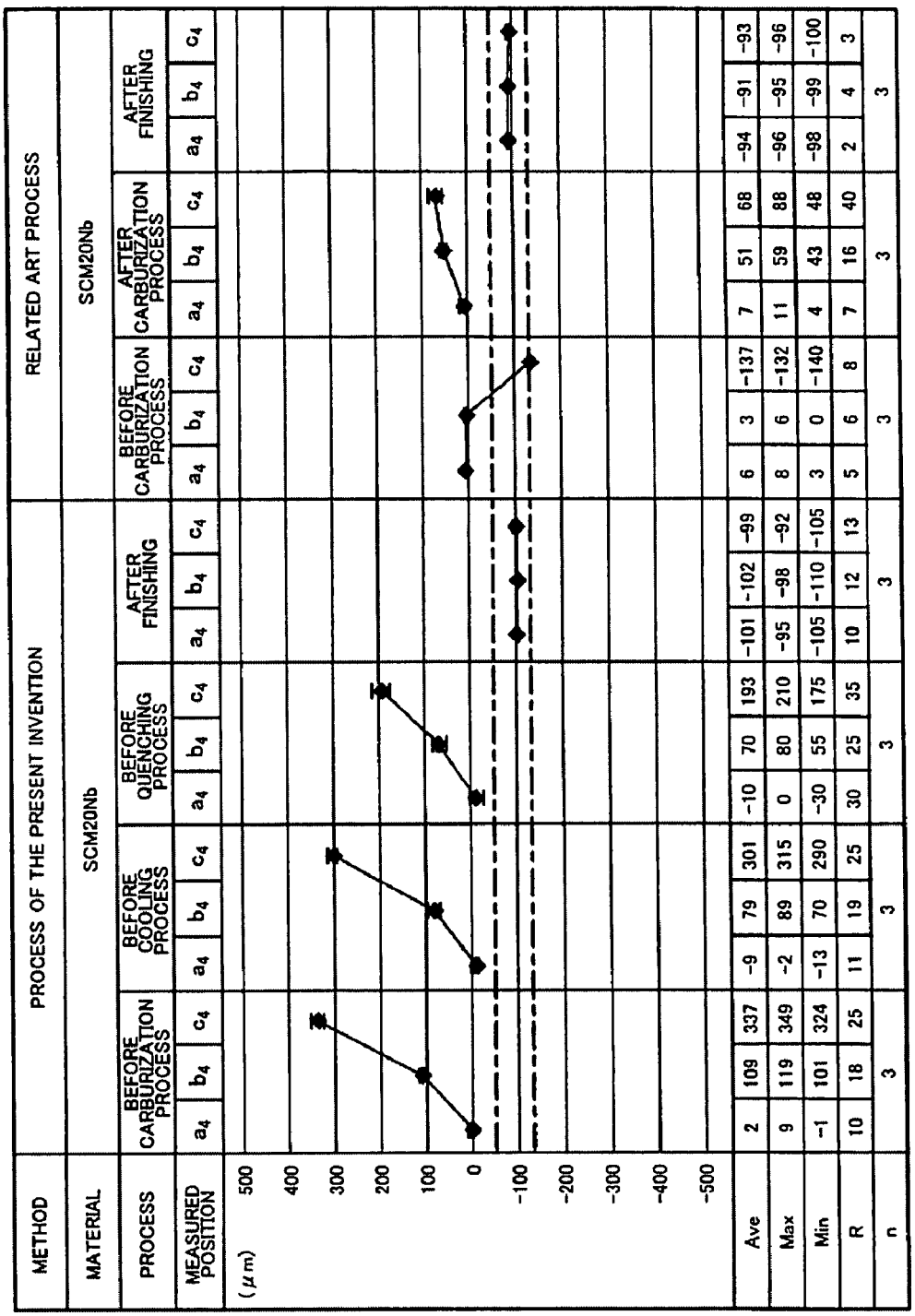
FIG. 9 is a table of the distortion measurement results for the surface of the movable sheave of the secondary pulley in example 2.

Next, as shown in FIG. 9, distortion of above-described secondary movable sheaves 84 manufactured by the process of the present invention and the related art process as described above, were evaluated.

The same steel (raw material), i.e. SCM420Nb manufactured by Aichi Steel (KK), was used in both the process of the present invention and in the related art process.

FIG. 9 shows, for the process of the present invention, the results of distortion measurement at 4 different times: before the carburization step S13, after the cooling step S14, after the high-frequency heating/quenching step S15, and after the finishing step S17. For the related art process, the results of distortion measurement at 3 different times are shown: before and after the carburization quenching step S23, and after the finishing step S25.

As shown in FIG. 4, the distortion measurements of the secondary movable sheaves 84 described above were made at three locations ($a_4$ to $c_4$) on the sheave surface 845. The measured position $a_4$ is a position at which the distance $D_{41}$ from the shaft center of the secondary sliding sheave 84 was 55 mm, the measured position $b_4$ is a position at which the distance $D_{42}$ from the shaft center was 98 mm, and the measured position $c_4$ is a position at which the distance $D_{43}$ from the shaft center was 135 mm. In addition, the evaluation involved measurement of the axial distance between each of the measured positions and a predetermined reference point, and calculation of the difference between the distance and a target value. In addition, similar to the case of example 1, the evaluation was made using the average value (AVE) for the entire circumference, the maximum value (MAX) for the entire circumference, the minimum value (MIN) for the entire circumference, and the difference (R) between the maximum value and the minimum value. Note that the number of the experiments is shown as n. In the middle section of FIG. 9, the results of measurement are shown as a graph.

As can be understood from the figure, similar to example 1, in the case of the process of the present invention, throughout the entire heat treatment process, the shape characteristics were stable, and the relative position relationships between at least the measured position $a_4$ and the measured position $c_4$ changed little.

In contrast, in the related art process, the shape changed significantly as between before the carburization quenching and after the carburization quenching.

From the above results, the process of the present invention better suppresses the distortion caused by the heat treatment, as compared to the related art process. Further, if the shape before the heat treatment is suitably maintained, it can be said that the grinding allowance for the final finishing process is also reduced.

Example 3

Figure 10:
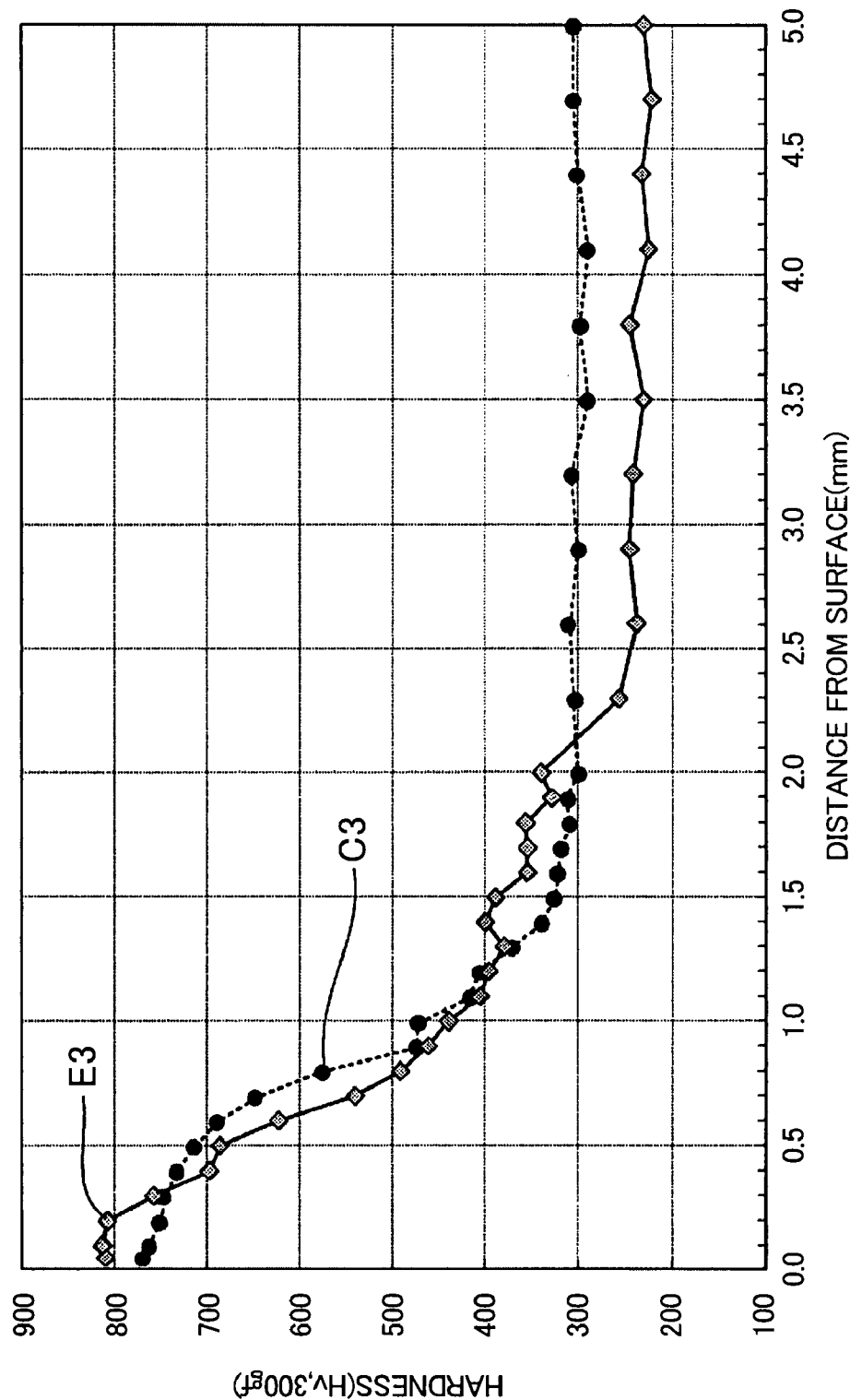
FIG. 10 is a graph of the hardness measurement results (hardness versus distance from surface) for the sheave surface of the fixed sheave of the primary pulley in example 3.

Next, as shown in FIG. 10, the quenching characteristics of the sheave surfaces 815 for the primary fixed sheaves 81 that have been manufactured by the process of the present invention and the related art process as described above, were evaluated.

The same raw material, SCM420Nb manufactured by Aichi Steel (KK), was used in both the process of the present invention and that of the related art process.

As shown in FIG. 1, the hardness measurement of the sheave surface 815 was a measurement of the Vickers hardness wherein the weight loaded on an indenter was 300 gf at the cross-section of the measured position b1. The measured position b1 was a position located a distance $D_{12}$, here 98 mm from the center of the primary fixed sheave 81. The results of the hardness measurements are shown in FIG. 10 wherein the distance from the surface is shown on the abscissa and the Vickers hardness (Hv) is shown on the ordinate. In addition, the results for the present invention are shown as E3, and the results for the related art are shown as c3.

As can be understood from the figure, in proximity to the uppermost surface, the present invention, which used high-frequency heating/quenching, attained a high hardness. At a depth greater than 2.0 mm from the surface, the hardness produced by the related art process was slightly higher, considered to be due to having quenched the entire product. It can be understood that, in the process of the present invention, the surface hardness did not decrease at all, but rather improved.

Example 4

Figure 11:
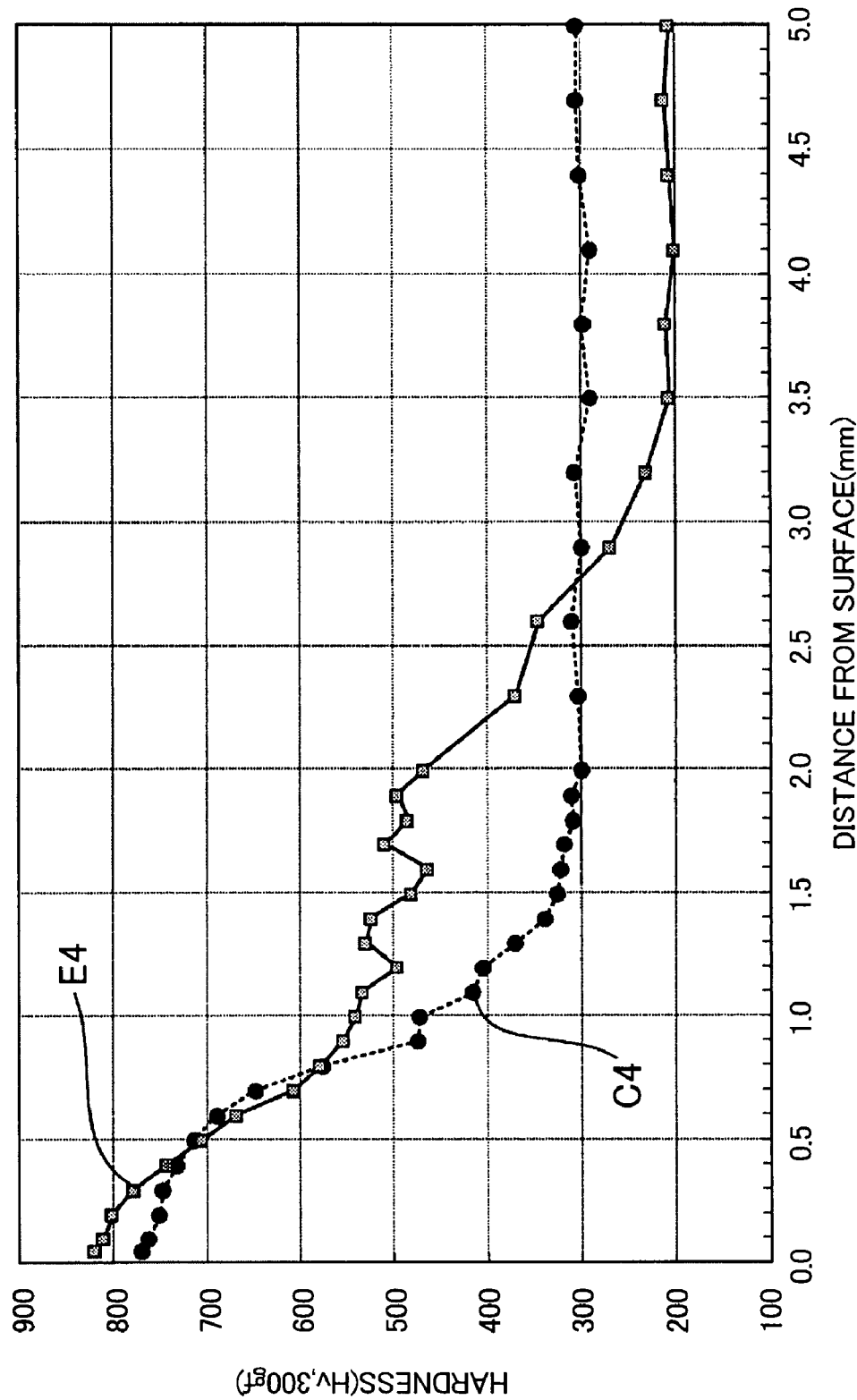
FIG. 11 is a graph of the hardness measurement results (hardness versus distance from surface) for the sheave surface of the fixed sheave of the primary pulley in example 4.

Next, as shown in FIG. 11, the hardness characteristics of sheave surfaces 815 for the primary fixed sheaves 81 formed of different materials and processed by the present invention and the related art process, as described above, were evaluated.

SCM420Nb manufactured by Aichi Steel (KK) was used as the raw material in the related art process, similar to above, while S30C was used as the raw material in the process of the present invention.

The method hardness measurement of the sheave surface 815 was the same as that given above for example 3. The results of the hardness measurements are shown in FIG. 11 wherein the abscissa gives the distance from the surface, and the ordinate gives the Vickers hardness (Hv). In addition, the results obtained with the present invention are shown as E4 and the results obtained with the related art process are shown as C4.

As can be understood from the figure, in this example as well, in proximity to the uppermost surface, the present invention, which used high-frequency heating/quenching, provided a high hardness. At a depth greater than 2.5 mm from the surface, the product of the related art process had a slightly greater hardness, considered to be due to the quenching of the entire product. Again, it can be understood that when the process of the present invention is used, the characteristics of the surface hardness do not decrease at all, but rather, are improved. In addition, from these results, it is understood that the desired hardening effect is achieved by the present invention both with SCM420Nb, which is a comparatively unique steel, and with the conventional carbon steel, S30C.

Example 5

Figure 12:
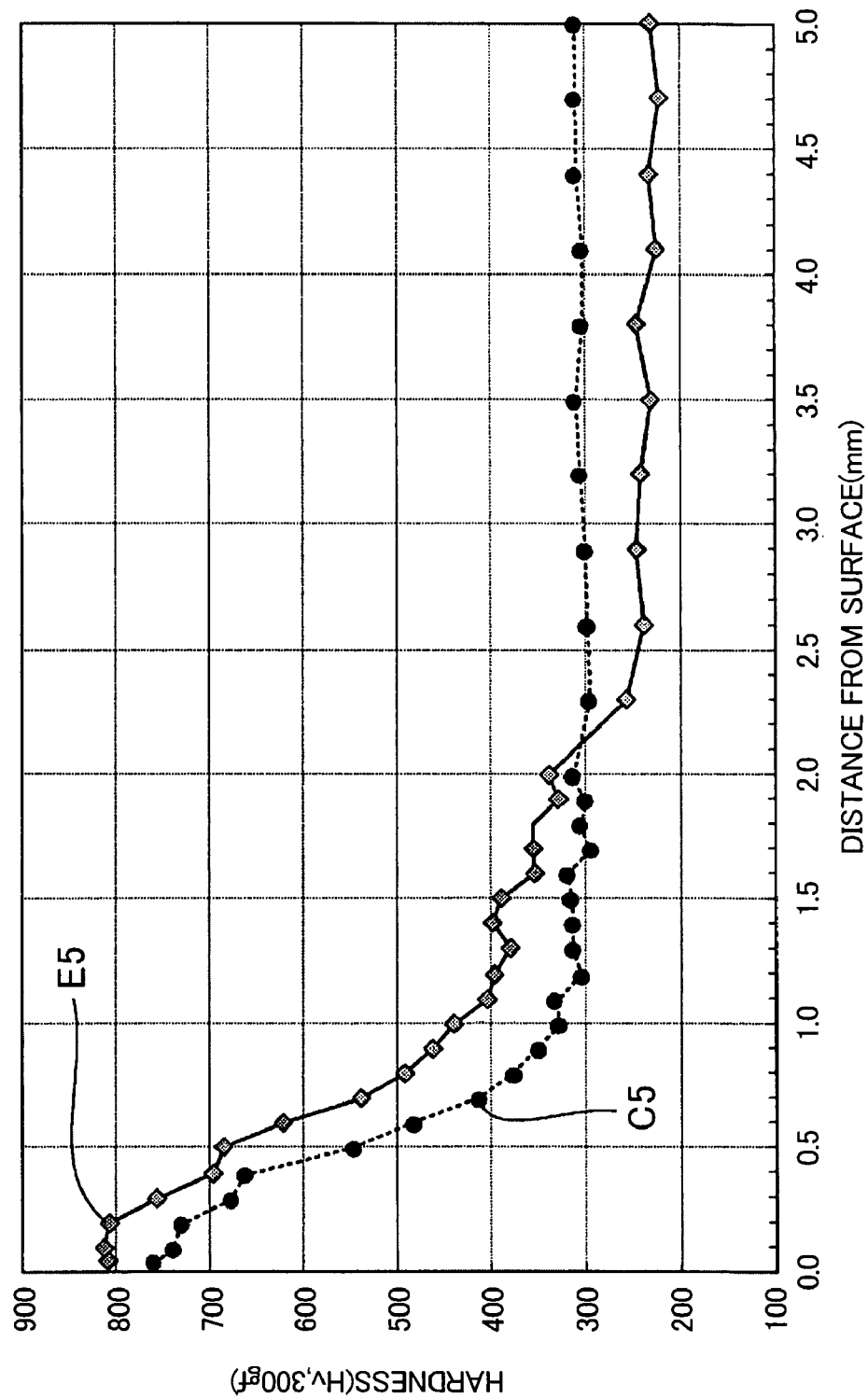
FIG. 12 is a graph of the hardness measurement results (hardness versus distance from surface) for the sheave surface of the fixed sheave of the secondary pulley in example 5.

FIG. 12 shows the hardness characteristics of the sheave surfaces 835 for secondary fixed sheaves 83 manufactured by the present invention and by the related art process.

As the raw material, SCM420Nb manufactured by Aichi Steel (KK) was used both for the present invention and for the related art process.

The hardness of the sheave surfaces 835 was measured in the same manner as in example 3 described above, at position $b_3$. The results of the hardness measurements are shown in FIG. 12 wherein the abscissa gives the distance from the surface and the ordinate gives the Vickers hardness (Hv). In addition, the results for the present invention are shown as E5 and the results for the related art process are shown as C5.

As can be understood from the figure, in the present example as well, in proximity to the outermost surface, the present invention provided a high hardness. At a depth 2.0 mm from the surface, the hardness provided by the related art process was slightly higher, considered to be due to the entire product being quenched. In both measurements, the characteristics of the surface hardness were not reduced, but rather improved by the present invention.

Example 6

Figure 13:
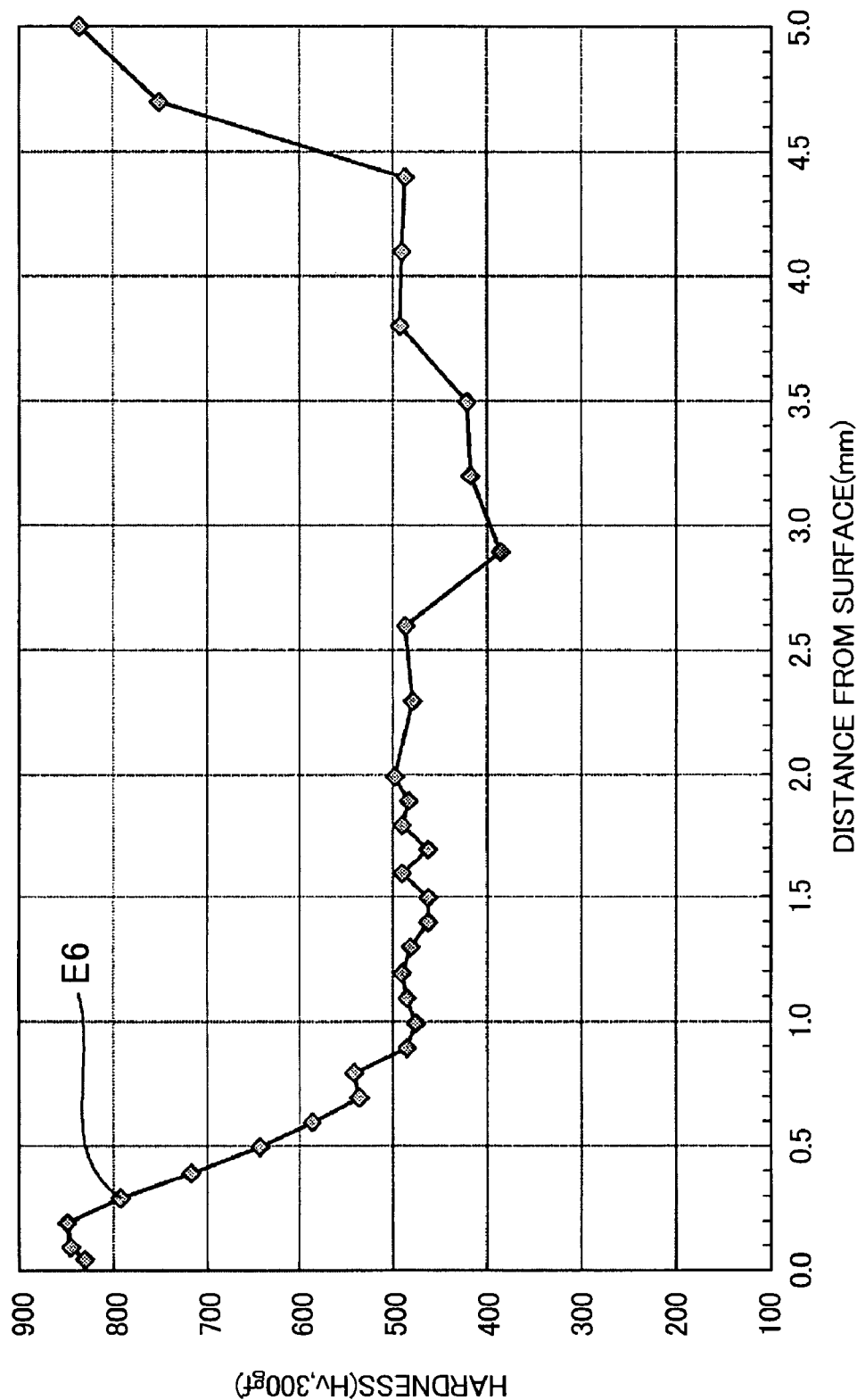
FIG. 13 is a graph of the hardness measurement results (hardness versus distance from surface) for the shaft portion of the fixed sheave of the secondary pulley in example 6.

FIG. 13 shows the hardness characteristics of the shaft portion 830 of a secondary fixed sheave 83 that was manufactured by the process of the present invention.

The raw material is SCM420Nb manufactured by Aichi Steel (KK).

As shown in FIG. 3, the hardness measurement of the shaft portion 830 of the secondary fixed sheave 83 was carried out at the cross-section at position $d_3$ on the outer circumferential surface of the shaft portion 830. The results of the hardness measurements are shown in FIG. 13 wherein the abscissa shows the distance from the surface, and the ordinate shows the Vickers hardness (Hv). The present invention is shown as E6.

As can be understood from the figure, in the present example, in proximity to the inner and outer surfaces, the desired increase in hardness was achieved.

Example 7

Figure 14:
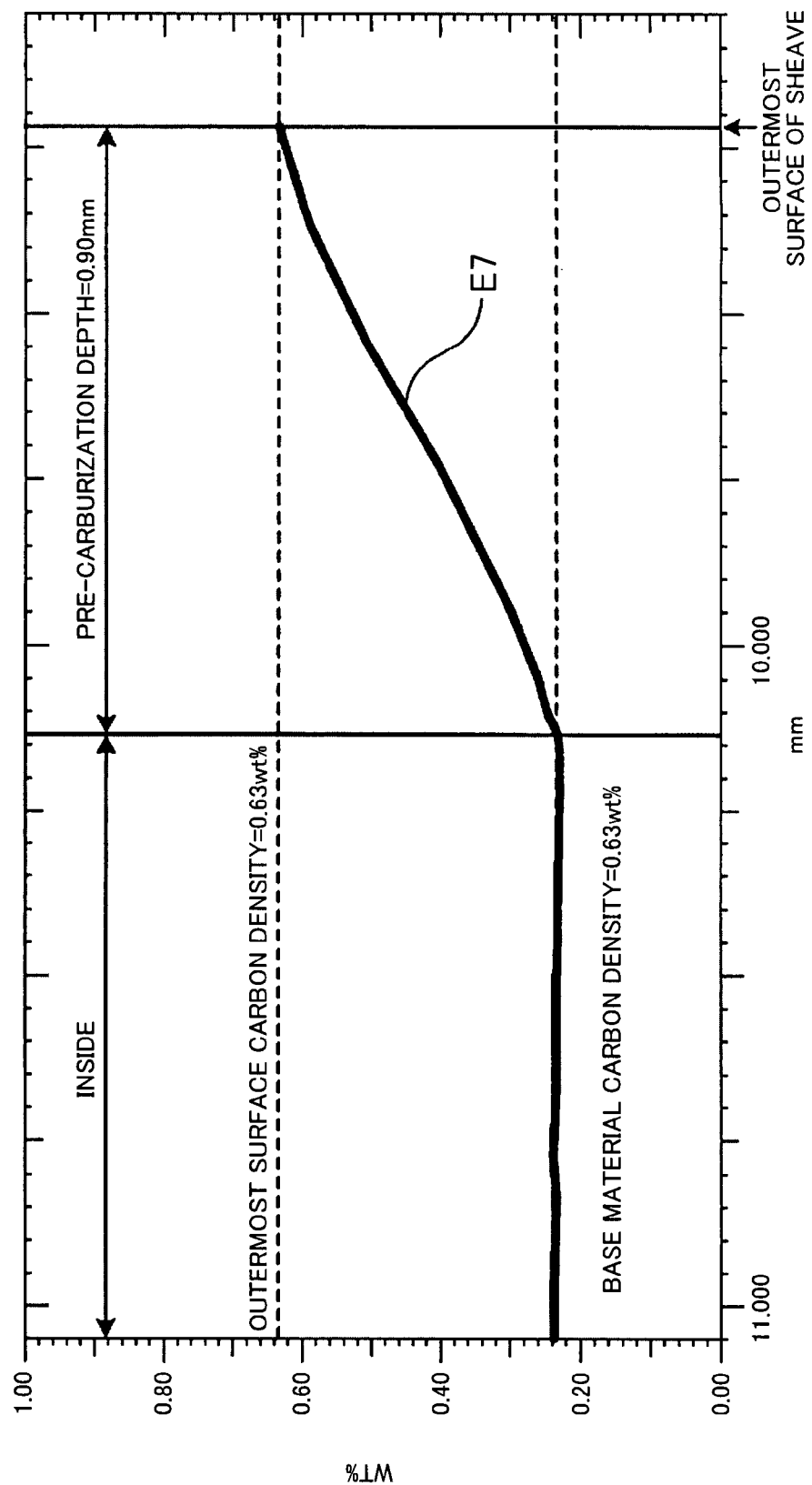
FIG. 14 is a graph of the carbon density versus depth for the sheave surface of the fixed sheave of the secondary pulley in example 7.

FIG. 14 shows the carbon density in the cross-section of the sheave surface 835 of the secondary fixed sheave 83 manufactured by the process of the present invention, in order to evaluate the effect of the carburization step (S13). The measurement of carbon density was carried out by using an electron probe micro analyzer (EPMA).

The raw material was SCM420Nb manufactured by Aichi Steel (KK).

The carbon density measurements for the sheave surface 835 were at position b3 (FIG. 3). The results are shown in FIG. 14 wherein the abscissa gives the distance from the surface, and the ordinate gives the carbon density (wt %). In addition, the measurement results are shown as E7 (after curve smoothing).

As can be understood from FIG. 14, in proximity to the outermost surface the carburization step gave a sufficiently high carbon density, reaching a maximum of 0.63 wt %.

Example 8

Next, a static torsion test was performed for the secondary fixed sheaves 83 manufactured by the process of the present invention and that of the related art as described above.

The raw material was SCM420Nb, manufactured by Aichi Steel (KK), in both the process of the present invention and that of the related art.

A conventional static torsion test was used, in which both ends of the shaft portion of secondary fixed sheave 83 were held by a testing machine and torsion stress was applied to the opposing ends of the shaft portion. In addition, in the present example, the torque at the proportional limit (proportional torque) and the torque during fracturing (fracture torque) were measured and evaluated. The results of the measurements are shown in TABLE 2.

TABLE 2

Static torsion test results

| Test | | Related art Process | Process of the Present Invention |
|---|---|---|---|
| Proportional torque | Measured value (Nm) | 851 | 1358 |
| | Improvement with the related art | — | 60% Up |
| Fracture torque | Measured value (Nm) | 2027 | 2287 |
| | Improvement with the related art | — | 13% Up |

As can be understood from TABLE 2, with respect to the proportional limit torque, the present invention provided an improvement of 60% as compared to the related art process. Furthermore, with respect to the fracture torque as well, the present invention provided an improvement of 13% over the related art process.

The above results show that the present invention provides a significant improvement in torsion characteristics over the related art.

Reference Example 1

In this reference example, rather than the CVT sheaves 81 to 84 of embodiment 1, the treated product was a ring gear, which is a steel member in which the influence of cooling distortion can be more clearly seen. The results of the reference example also apply to the method of manufacturing the CVT sheaves.
Test 1

Figure 15:
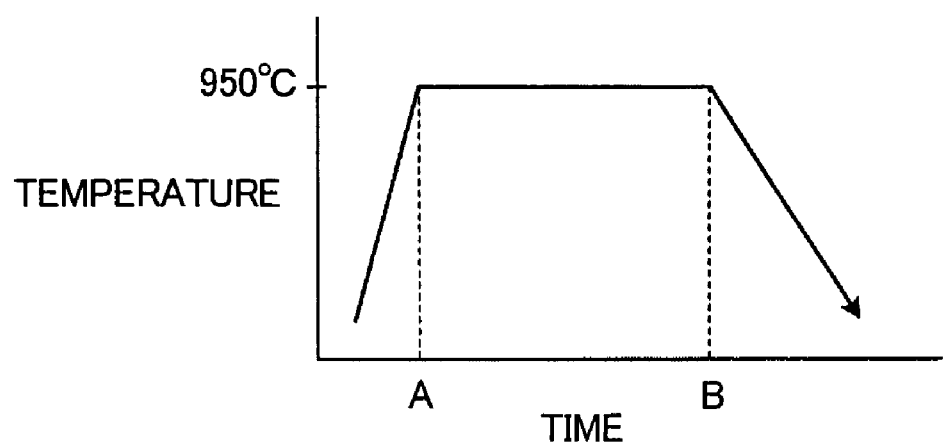
FIG. 15 is a graph of the cooling pattern (temperature versus time) of the steel member in test 1 of reference example 1.

As shown in FIG. 15, in test 1, a carburization treatment was carried out in which the steel ring gear member was heated to 950° C., which is equal to or greater than the austenitizing temperature, and then the steel member was cooled to below 150° C.

FIG. 15 shows the temperature history of the steel member, wherein the abscissa shows the time and the ordinate shows the temperature (FIG. 16 to FIG. 18, which will be described later, are similar). In the heat treatment, the interval from point A to point B in the figure is the period of the heat treatment, and the cooling interval is the period after point B. In test 1, from the commencement of the cooling of the steel member until the completion of its cooling, the cooling was by contact with a cooling gas at a pressure less than atmospheric pressure.

$N_2$ was used as the cooling gas, at a constant pressure of 0.3 bar with agitation. The fan used to agitate the cooling gas was operated at a constant speed of 550 rpm, which was the rated speed.
Test 2

Figure 16:
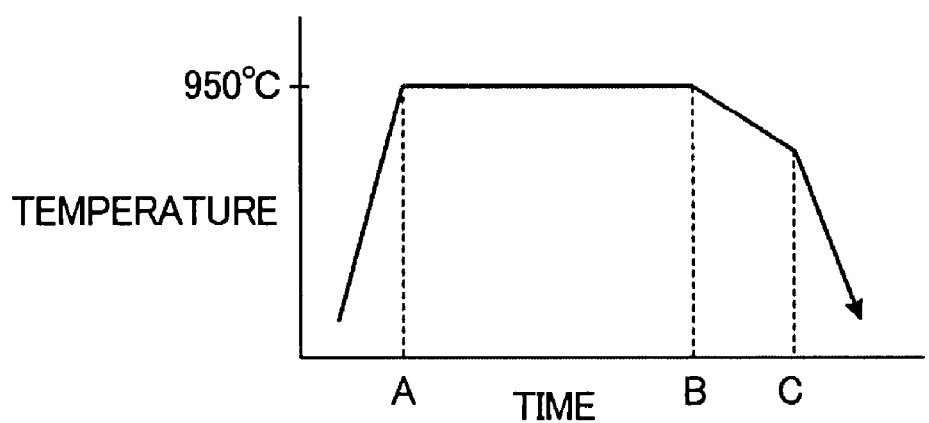
FIG. 16 is a graph of the cooling pattern (temperature versus time) of the steel member in test 2 of reference example 1.

As shown in FIG. 16, in test 2, during the cooling period, i.e. from the commencement of the cooling of the steel member until the completion of its cooling, the pressure of the cooling gas was less than atmospheric pressure. Similar to test 1, $N_2$ was used as the cooling gas at a constant pressure of 0.3 bar. However, the agitation speed was changed. Whereas the agitation fan was initially operated at a constant speed of 250 rpm, after 15 minutes (point C in FIG. 16) the rotational speed was increased to a constant speed of 550 rpm. Otherwise, the conditions were identical to those of test 1.
Test 3

Figure 17:
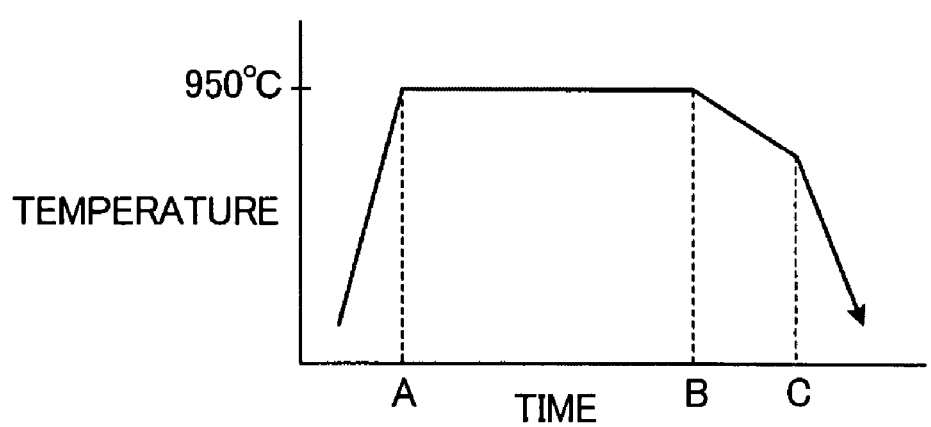
FIG. 17 is a graph of the cooling pattern (temperature versus time) of the steel member in test 3 in the reference example 1.

As shown in FIG. 17, in test 3, from the commencement of the cooling of the steel member until the completion of its cooling, the pressure of the cooling gas was less than atmospheric pressure. However, the conditions were different in that $N_2$ was used as the cooling gas at a constant reduced pressure of 0.65 bar. Initially, there was no agitation of the cooling gas and, subsequently, after 15 minutes (point C in FIG. 17) the agitation fan was operated at a constant speed of 550 rpm. Otherwise, the conditions were identical to those of test 1.
Test 4 (Comparative Test)

Figure 18:
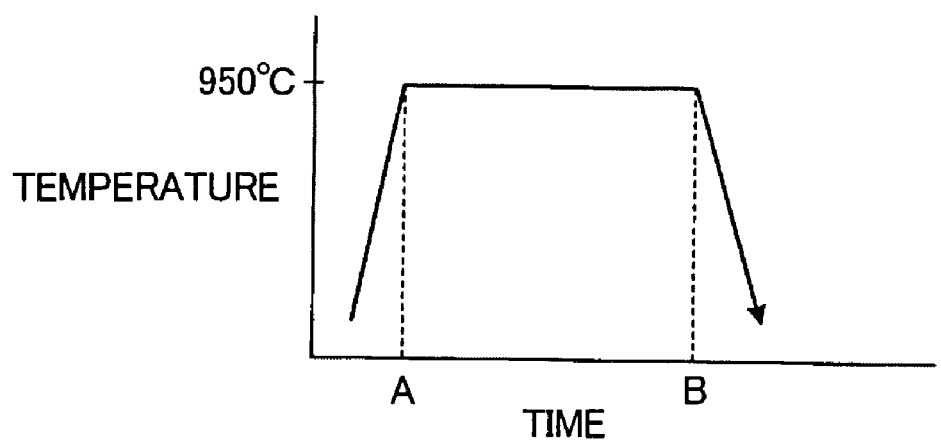
FIG. 18 is a graph of the cooling pattern (temperature versus time) of the steel member in test 4 in the reference example 1.

As shown in FIG. 18, in test 4, from the commencement of the cooling of the steel member until the completion of its cooling thereof, the cooling gas was at atmospheric pressure. Specifically, as cooling conditions, the pressure of the cooling gas was set to a constant pressure of 1.0 bar (atmospheric pressure), and the rotational speed of the agitation fan was set to a constant at 250 rpm, which was below the rated speed. The heat treatment conditions before the cooling were identical to those of test 1.

Next, the ring gear was treated by the cooling method of tests 1 to 3 and test 4, described above, and the amount of distortion was compared by measuring the dimensions of the ring gear.

Steel balls having a predetermined diameter were placed between the gear teeth, in contact with the valley portion of the teeth surfaces, and the evaluation was carried out based on measurement of the inner diameter (BBD) between the opposing steel balls.

In the case of all of tests 1 to 3, the elliptical state that was known from the BBD was smaller than in test 4 (the comparative test), and thus the distortion was extremely low.

Embodiment 2

Figure 19:
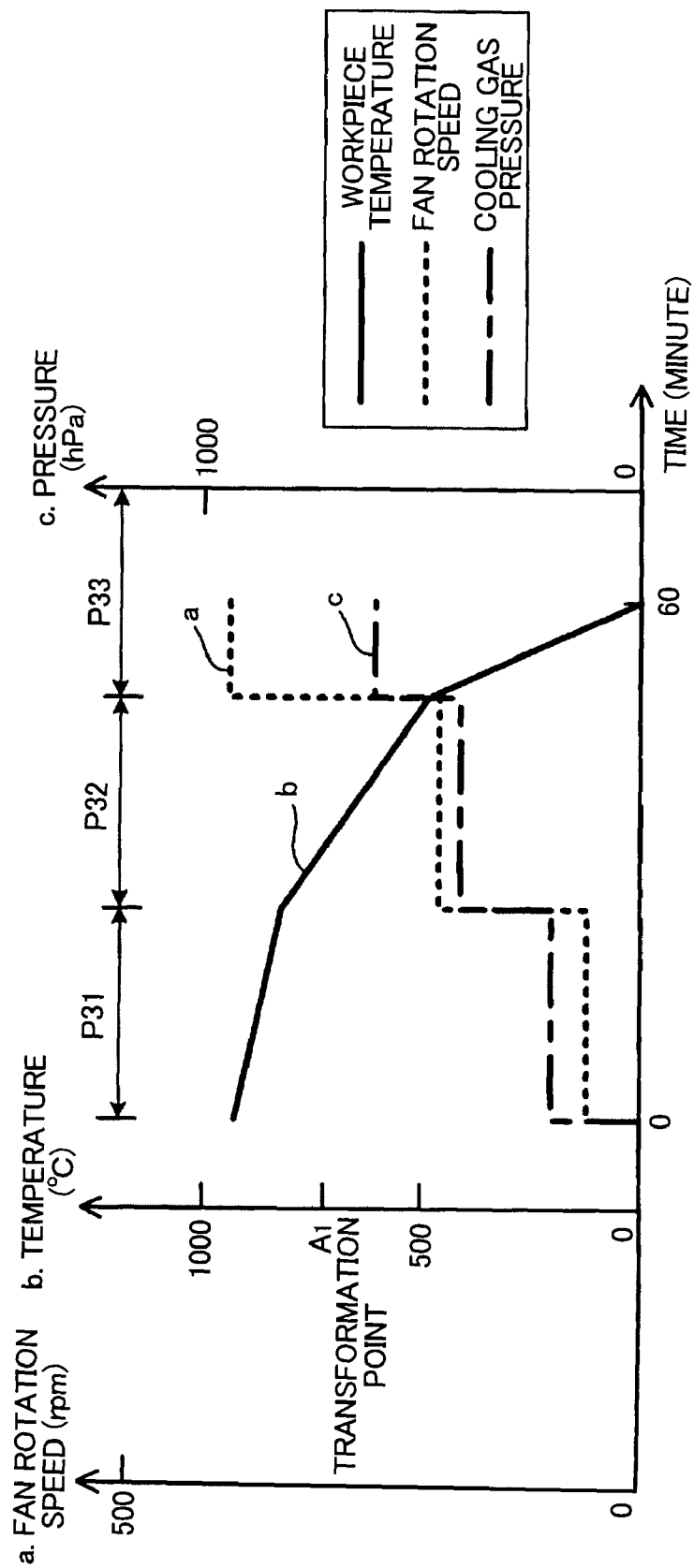
FIG. 19 is a graph of the gradual cooling pattern (temperature versus time) under reduced pressure in second embodiment.

The reduced pressure gradual cooling pattern shown in FIG. 19 (Embodiment 2) can be adopted as the reduced pressure gradual cooling process a2 of embodiment 1.

In FIG. 19, the abscissa shows time, the first ordinate shows the rotational speed of a cooling fan (a), the second ordinate shows the temperature of the treated member (b), and the third ordinate shows the pressure of the cooling gas (c).

As can be understood from FIG. 19, in this embodiment, during the initial first cooling period P31, the rotational speed of the cooling fan is set low, and at the same time, the cooling gas pressure is at a reduced pressure significantly lower than atmospheric pressure.

Next, during the second cooling period P32, the rotational speed of the cooling fan was set slightly higher than in the first cooling period P31, but sufficiently lower than the rated speed. Further, the cooling gas pressure was set slightly higher than in the first cooling period P31 and the cooling capacity of the second cooling period P32 was slightly higher than that in the first cooling period P31. In this embodiment, during this second cooling period P32, the temperature of the treated member dropped below the transformation point A1.

Next, during a third cooling period P33, for quenching after high-frequency reheating, the rotational speed of the cooling fan and the cooling gas pressure were increased.

As described above, in the first cooling period P31, in which the initial treated member is at its highest temperature, it is possible to reliably suppress cooling distortion with a low pressure cooling gas and low circulating speed (low rotational speed of the cooling fan). Next, in the second cooling period P32, because the possibility of the occurrence of cooling distortion has already been lowered, even though the cooling capacity is slightly increased, the reduced pressure gradual cooling pattern is adopted in order to suppress distortion due to the microstructure transformation at temperatures exceeding the transformation point A1 of steel. Thus, it is possible to largely suppress distortion at temperatures above the transformation point A1. Subsequently, in the third cooling step P33, it is possible to maximize the cooling capacity by increasing the pressure of the cooling gas and the circulation speed.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A method of manufacturing a sheave member for a belt-type continuously variable transmission that is provided with a sheave including a shaft portion and a sheave portion, the sheave portion surrounding the shaft portion and presenting a conical sheave surface which contacts the belt and which is radially outward of the shaft portion, the method comprising:
   a forming step in which a steel material is forged to form an intermediate product having a conical sheave surface;
   a carburization step in which the intermediate product is carburized by heating the intermediate product in a carburization gas;
   a gradual cooling step in which the intermediate product, after completion of the carburization step, is cooled at a cooling speed slower than a speed at which the microstructure of the intermediate product undergoes a martensitic transformation;
   a step of high frequency heating only a selected portion of the surface of the intermediate product to be strengthened by quenching, rather than the entire intermediate product, the selected portion including the conical sheave surface;
   a quenching step in which the selectively heated portion of the intermediate product is quenched by contact with water; and
   a finishing step in which the intermediate product is finished by a grinding to a final shape.

2. The method according to claim 1, wherein, in the gradual cooling step, cooling is at a cooling speed equal to or less than 20° C./sec, at least until the temperature of the intermediate product has passed through the transformation point A1.

3. The method according to claim 1, wherein, in the gradual cooling step, cooling is at a cooling speed equal to or less than 10° C./sec, at least until the temperature of the intermediate product has passed through the transformation point A1.

4. The method according to claim 1, wherein, in the gradual cooling step, the intermediate product is contacted with a cooling gas at a pressure lower than atmospheric pressure until temperature of the intermediate product is decreased to an A1 transformation point or lower.

5. The method according to claim 4, further comprising agitating the cooling gas.

6. The method according to claim 4, wherein the gradual cooling step is conducted over a time period extending from a time before the microstructure transformation of the intermediate product at least until the transformation of the entire microstructure has been completed.

7. The method according to claim 4, wherein the cooling gas is at a pressure within a range of 0.1 bar to 0.65 bar until temperature of the intermediate product is decreased to an A1 transformation point or lower.

8. The method according to claim 7, wherein the cooling gas is at a pressure within a range of 0.1 bar to 0.3 bar until temperature of the intermediate product is decreased to an A1 transformation point or lower.

9. The method according to claim 5, wherein the agitating of the cooling gas is at a speed which is increased after the temperature of the intermediate product has become equal to or less than the transformation point A1.

10. The method according to claim 4, wherein the pressure of the cooling gas is increased after the temperature of the intermediate product has become equal to or less than the transformation point A1.

11. The method according to claim 1, wherein the carburization gas is at a pressure lower than atmospheric atmosphere.

12. The method according to claim 11, wherein, in the carburization step, the intermediate product is heated to a temperature equal to or greater than austenitizing temperature, with the carburization gas at a pressure of 0.001 to 0.1 bar.

13. The method according to claim 1, wherein the steel material is a carbon steel that contains C in the amount of 0.20 to 0.45 percent, as mass present.

14. The method according to claim 13, wherein the carburization step produces a maximum carburization density in the carburization layer of C at 0.5 to 1.0 mass percent.

15. The method according to claim 1, wherein the cooling speed in the water quenching step is 200° C./sec to 2000° C./sec.

16. The method according to claim 2, wherein the cooling speed in the water quenching step is 200° C./sec to 2000° C./sec.

17. The method according to claim 3, wherein the cooling speed in the water quenching step is 200° C./sec to 2000° C./sec.

* * * * *